(12) United States Patent
Shimizu et al.

(10) Patent No.: US 7,516,415 B2
(45) Date of Patent: Apr. 7, 2009

(54) APPARATUS FOR AND METHOD OF GENERATING SYNCHRONIZED CONTENTS INFORMATION, AND COMPUTER PRODUCT

(75) Inventors: Seiya Shimizu, Kawasaki (JP); Motoo Masui, Kawasaki (JP); Asako Yumoto, Kawasaki (JP)

(73) Assignee: Fujitsu Limited, Kawsakai (JP)

( * ) Notice: Subject to any disclaimer, the term of this patent is extended or adjusted under 35 U.S.C. 154(b) by 711 days.

(21) Appl. No.: 10/331,504

(22) Filed: Dec. 31, 2002

(65) Prior Publication Data
US 2003/0188255 A1 Oct. 2, 2003

(30) Foreign Application Priority Data
Mar. 28, 2002 (JP) .............................. 2002-093166
Oct. 8, 2002 (JP) .............................. 2002-295438

(51) Int. Cl.
*G06K 15/00* (2006.01)
(52) U.S. Cl. ...................................... 715/780; 715/716
(58) Field of Classification Search ................. 715/780, 715/727–729, 730–732, 968, 771, 716, 717, 715/719, 772, 773; 707/10, 200; 345/510; 382/232, 100
See application file for complete search history.

(56) References Cited

U.S. PATENT DOCUMENTS

| | | | | |
|---|---|---|---|---|
| 6,100,881 A | * | 8/2000 | Gibbons et al. | 715/500.1 |
| 6,516,312 B1 | * | 2/2003 | Kraft et al. | 707/3 |
| 6,597,859 B1 | * | 7/2003 | Leinhart et al. | 386/65 |
| 6,636,238 B1 | * | 10/2003 | Amir et al. | 715/730 |
| 6,970,602 B1 | * | 11/2005 | Smith et al. | 382/232 |
| 2002/0046018 A1 | * | 4/2002 | Marcu et al. | 704/9 |
| 2002/0169872 A1 | * | 11/2002 | Nomiyama | 709/224 |
| 2004/0225791 A1 | * | 11/2004 | Keskar et al. | 710/300 |
| 2005/0152191 A1 | * | 7/2005 | Takahashi | 365/189.05 |

FOREIGN PATENT DOCUMENTS

CA 1286472 * 3/1991

\* cited by examiner

*Primary Examiner*—Steven P Sax
(74) *Attorney, Agent, or Firm*—Staas & Halsey LLP

(57) ABSTRACT

In a synchronized contents information generating apparatus, a keyword extractor extracts a characteristic keyword from document information whose document is an electronic document, and an audio analyzer measures a keyword appearance distribution in the order in which the extracted each keyword appears based on audio/video information that is audio and video, recorded by a video camera unit, of how a meeting using the document goes on. A synchronized contents information generator generates synchronized contents information used to display the document information in synchronization with the audio/video information based on the keyword appearance distribution.

13 Claims, 21 Drawing Sheets

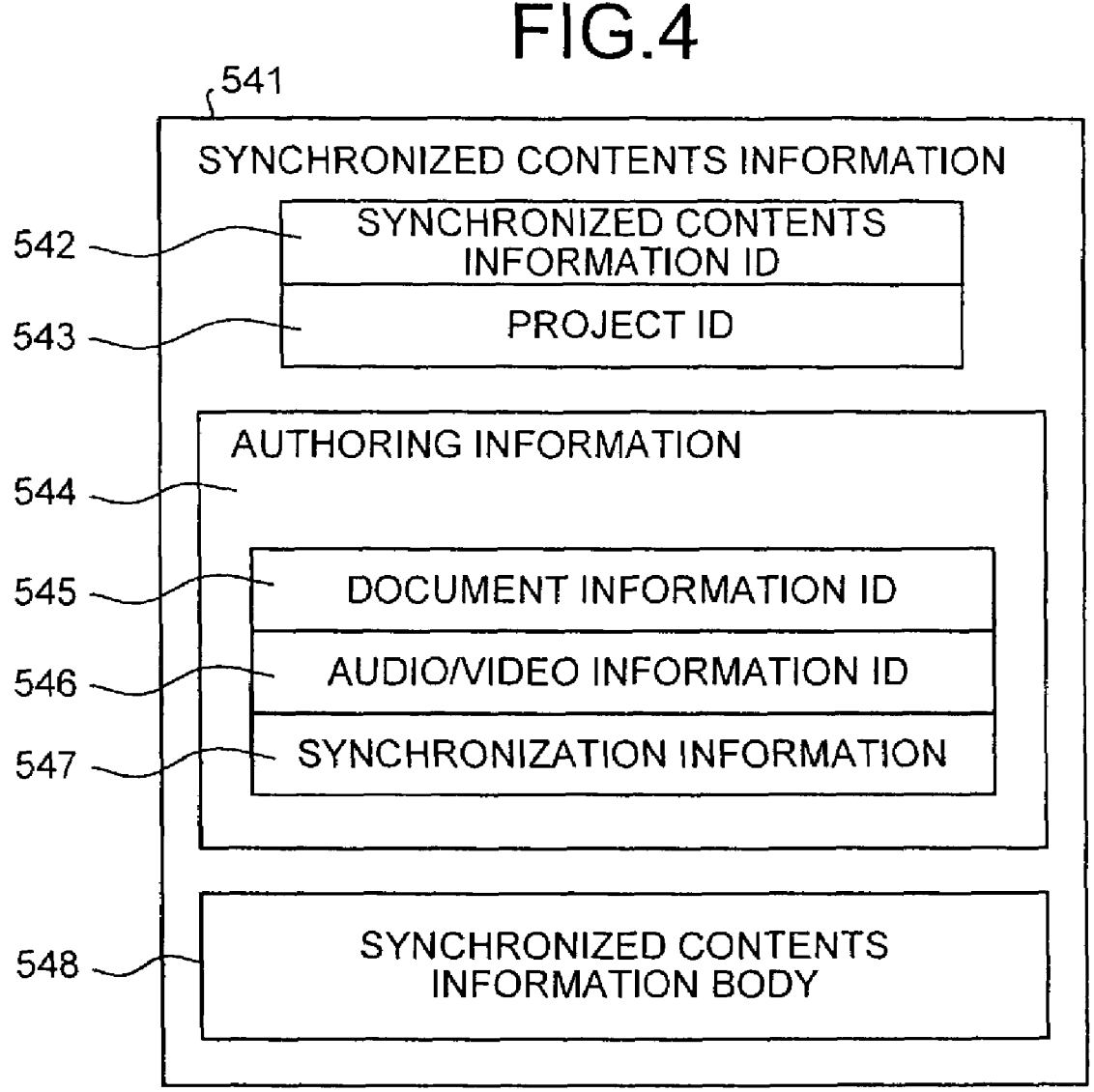

```
<smil>
<head>
<layout>
<root-layout width="1024px" height="768px"/>
<region id="bg" left="0px" top="0px" width="1024px" height="768px">
<region id="av" left="20" top="144" width="320" height"240">
<region id="doc" left="364" top="144" width="640" height"480">
</layout>
</head>
<body>
<par>
<image region="bg" src="backgroundimage.gif" type="image/gif"/>
<video region="av" src=AV DATA type="video/mpeg"/>
<text region="doc" src=FIRST-PAGE DATA OF THE ELECTRONIC DOCUMENT begin= $s_1$ end= $s_2$ </text>
<text region="doc" src=SECOND-PAGE DATA OF THE ELECTRONIC DOCUMENT begin= $s_2$ end= $s_3$ </text>
              ⋮
<text region="doc" src=m-th-PAGE DATA OF THE ELECTRONIC DOCUMENT begin= $s_m$ end= $s_{m+1}$ </text>
              ⋮
<text region="doc" src=M-th-PAGE DATA OF THE ELECTRONIC DOCUMENT begin= $s_M$ </text>
</par>
</body>
</smil>
```

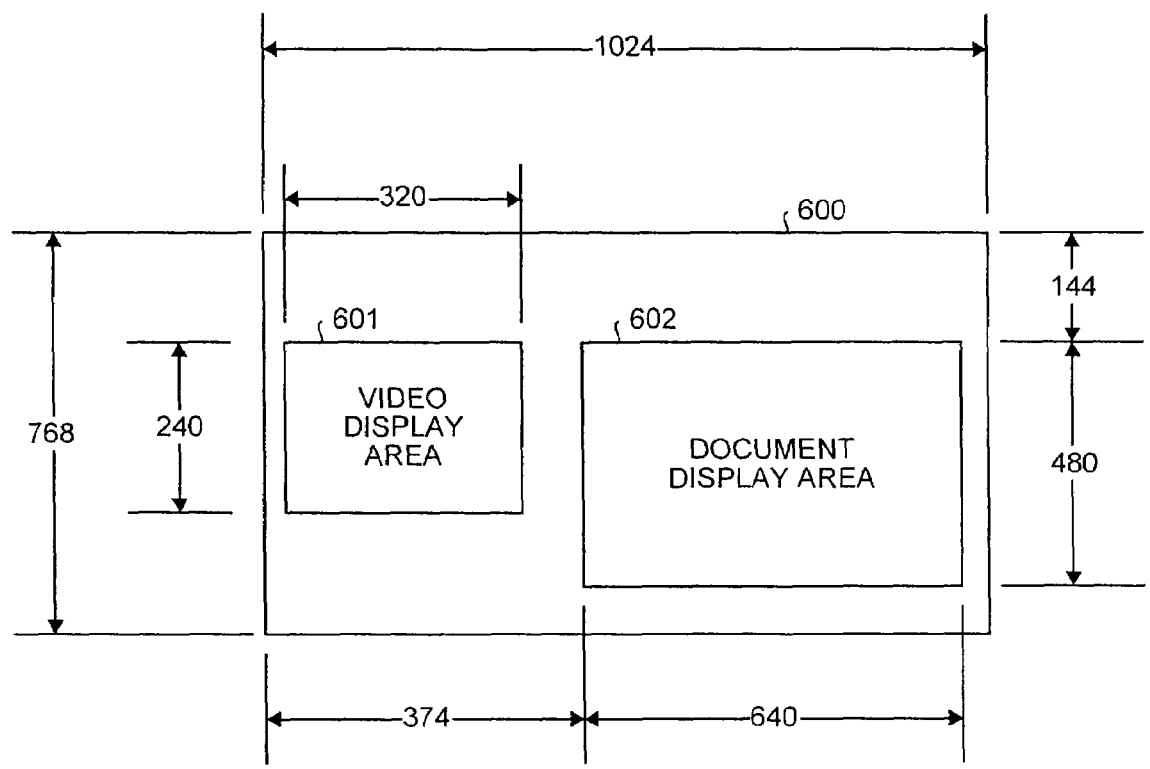

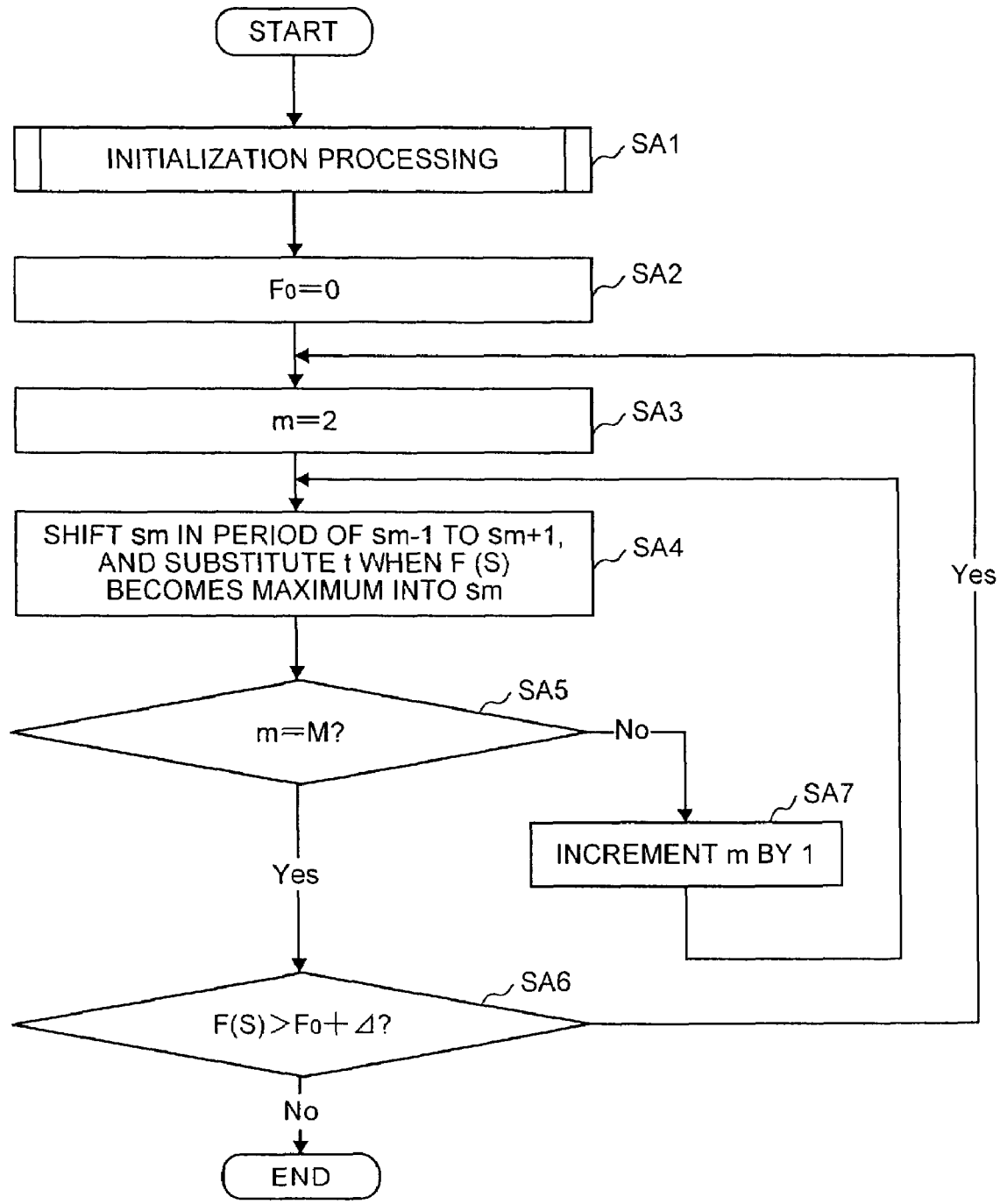

FIG.14

| RULE 1 | $q_p$ HAS A VALUE 1 OR 2. |
|---|---|
| RULE 2 | $r_p$ IS ONLY A KEYWORD INCLUDED IN ONLY THE m-TH PAGE. |
| RULE 3 | SATISFIES ONE OF THE FOLLOWING TWO RULES. |
| RULE 3-1 | IN $R$, THERE IS NO APPEARANCE KEYWORD $r_u$ THAT BECOMES $r_p = r_u$. |
| RULE 3-2 | WHEN THERE IS APPEARANCE KEYWORD $r_u$ THAT BECOMES $r_p = r_u$ IN $R$, p AND u SATISFY A RELATIONSHIP OF $0 < t_u - t_p < \Delta t$. |

```
<smil>
<head>
<layout>
<root-layout width="1024px" height="768px"/>
<region id="bg" left="0px" top="0px" width="1024px" height="768px">
<region id="av" left="20" top="144" width="320" height"240">
<region id="doc" left="364" top="144" width="640" height"480">
</layout>
</head>
<body>
<par>
<image region="bg" src="backgroundimage.gif" type="image/gif"/>
<video region="av" src="AV DATA type="video/mpeg"/>
<text region="doc" src="FIRST-PAGE DATA OF THE ELECTRONIC DOCUMENT begin=$s_1$ end=$s_2$ </text>
<text region="doc" src="SECOND-PAGE DATA OF THE ELECTRONIC DOCUMENT begin=$s_2$ end=$s_3$ </text>
  ..
<text region="doc" src=m-th-PAGE DATA OF THE ELECTRONIC DOCUMENT begin=$s_n$ end=$s_{n+1}$ </text>
  ..
<text region="doc" src=M-th-PAGE DATA OF THE ELECTRONIC DOCUMENT begin=$s_N$> </text>
</par>
</body>
</smil>
```

APPARATUS FOR AND METHOD OF GENERATING SYNCHRONIZED CONTENTS INFORMATION, AND COMPUTER PRODUCT

BACKGROUND OF THE INVENTION

1. Field of the Invention

The present invention relates to a technology for generating synchronized contents information in which audio/video information and electronic document information are synchronized with each other to be used in the sharing of information within a company, in educational fields, or entertainment fields. More particularly, this invention relates to a technology for generating synchronized contents information used to synchronously display audio/video information and document information without requiring any particular equipment like a projector.

2. Description of the Related Art

In recent years, digitized audio/video information has been stored and distributed at a low cost yet in a simple manner due to reduction in the cost of storage on a server and employment of a broadband in a network.

Accordingly, a meeting of a company has been changed in its style such that the meeting can be proceeding by distributing audio/video information using a video camera, in addition to progressing of the meeting using a relevant material mainly with a text such as a distributed material and minutes of the meeting. Therefore, in the company, it has become possible to transmit detailed contents of the meeting to those who cannot attend the meeting in real time, based on a display of the audio/video information and the relevant material in correlation with each other.

FIG. 23 is a block diagram showing a structure of a conventional synchronized contents information generating system. This synchronized contents information generating system generates synchronized contents information. The synchronized contents information is obtained by synchronizing a document (relevant material) of a plurality of pages distributed to attendants at a meeting, with audio/video information that records how a presentation using this document goes on.

A video camera unit 10 records how the presentation using the document goes on, and outputs speech and video as audio/video information 11 to a synchronized contents information generating apparatus 30. A projector 20 displays electronic document information 21 on a screen by enlarging the information in a page unit, according to the operation of a presenter. The electronic document information 21 is obtained by converting a document distributed to the attendants of the meeting to an electronic document.

The projector 20 outputs synchronization information 22, that is a time at which a page of the electronic document information 21 has shifted to the next page, to the synchronized contents information generating apparatus 30 through the operation of the presenter. In other words, the projector 20 outputs the synchronization information 22 indicating a page break each time when the displayed page shifts to the next page.

In other words, the synchronization information 22 indicates any time zone with which (to which) each page of the electronic document information 21 is synchronized (corresponds), on the time axis when the audio/video information 11 is reproduced.

The synchronized contents information generating apparatus 30 generates synchronized contents information 33 based on the audio/video information 11, the electronic document information 21, and the synchronization information 22. A database 31 stores the audio/video information 11, the electronic document information 21, and the synchronization information 22.

A synchronized contents information generator 32 acquires the audio/video information 11, the electronic document information 21, and the synchronization information 22 from the database 31, and generates synchronized contents information 33.

The synchronized contents information 33 is described in a scenario representing language like Synchronized Multimedia Integration Language (SMIL), and a script language like Java(R)Script. The synchronized contents information 33 is information in which each page of the electronic document information 21 is related to a time zone on a reproduction time axis of the audio/video information 11 based on the synchronization information 22.

A reproducing unit 40 has a browser like SMIL reproduction software, and reproduces the synchronized contents information 33. The synchronized contents information 33 is viewed by those who are not able to attend the meeting. The reproducing unit 40 displays the reproduced speech and video of the audio/video information 11, and the pages of the electronic document information 21 synchronized with the reproduced information.

The above conventional synchronized contents information generating system has the following problems. (1) The electronic document information 21 must be ready at the time of making presentation (Preparation of the electronic document information 21 at a later date is not useful.). (2) The special projector 20 is necessary for output of the synchronization information 22 representing a correlation between the reproduction time axis of the audio/video information 11 and each page of the electronic document information 21. (3) The system can work for only the presentation using the projector 20 (The system cannot be adapted to a material that is not prepared as an electronic material and that is prepared only on a paper medium at the point in time when the presentation is started.).

SUMMARY OF THE INVENTION

It is an object of the present invention to provide a synchronized contents information generating program, a synchronized contents information generating apparatus, and a synchronized contents information generating method capable of generating synchronized contents information for synchronously displaying audio/video information and document information, without requiring any particular equipment like a projector.

The synchronized contents information generating program according to one aspect of this invention, makes a computer function as a keyword extracting unit that extracts a characteristic keyword or characteristic keywords from document information whose document is an electronic document, and a keyword appearance distribution measuring unit that measures a distribution of appearances of the keyword in the order in which the extracted each keyword appears based on audio/video information that is recorded audio and video of how a speaker speaks using the document. The program also makes the computer function as a synchronized contents information generating unit that generates synchronized contents information used to display the document information in synchronization with the audio/video information based on the keyword appearance distribution.

The synchronized contents information generating apparatus according to another aspect of this invention, comprises a keyword extracting unit that extracts a characteristic keyword or characteristic keywords from document information whose document is an electronic document, and a keyword appearance distribution measuring unit that measures a distribution of appearances of the keyword in the order in which the extracted each keyword appears, based on audio/video information that is recorded audio and video of how a speaker speaks using the document. The apparatus also comprises a synchronized contents information generating unit that generates synchronized contents information used to display the document information in synchronization with the audio/video information based on the keyword appearance distribution.

The synchronized contents information generating method according to still another aspect of this invention, comprises the steps of extracting a characteristic keyword or characteristic keywords from document information whose document is an electronic document, measuring a keyword appearance distribution that is a distribution of appearances of the keyword in the order in which the extracted each keyword appears based on audio/video information that is recorded audio and video of how a speaker speaks using the document, and generating synchronized contents information used to display the document information in synchronization with the audio/video information based on the keyword appearance distribution.

The synchronized contents information generating program according to still another aspect of this invention, makes a computer function as a document block dividing unit that divides document information whose document is an electronic document, into a plurality of document blocks, and an audio segmenting unit that segments audio information into a plurality of continuous speech segments, based on audio/video information that is recorded audio and video of how a speaker speaks using the document. The program also makes the computer function as a distributing unit that distributes the continuous speech segments to the document blocks, and a synchronized contents information generating unit that generates synchronized contents information used to display the document information in synchronization with the audio/video information based on a result of the distribution.

The synchronized contents information generating apparatus according to still another aspect of this invention, comprises a document block dividing unit that divides document information whose document is an electronic document, into document blocks, and an audio segmenting unit that segments audio information into continuous speech segments, based on audio/video information that is recorded audio and video of how a speaker speaks using the document. The apparatus also comprises a distributing unit that distributes the continuous speech segments to the document blocks, and a synchronized contents information generating unit that generates synchronized contents information used to display the document information in synchronization with the audio/video information based on a result of the distribution.

The synchronized contents information generating method according to still another aspect of this invention, comprises the steps of dividing document information whose document is an electronic document, into document blocks, segmenting audio information into continuous speech segments, based on audio/video information that is recorded audio and video of how a speaker speaks using the document, distributing the continuous speech segments to the document blocks, and generating synchronized contents information used to display the document information in synchronization with the audio/video information based on a result of the distribution.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 4 is a diagram showing a structure of synchronized contents information 541 stored in a synchronized contents information database 540 shown in FIG. 1, FIG. 5 is a diagram showing a detailed example of the synchronized contents information 541 shown in FIG. 4, FIG. 6 is a diagram showing a reproduction screen format 600 corresponding to the synchronized contents information 541 shown in FIG. 4, FIG. 7 is a flowchart for explaining the operation of the first embodiment, FIG. 14 is a diagram for explaining a rule applied to the first modification of the first embodiment, FIG. 19 is a diagram showing a detailed example of the synchronized contents information 731 shown in FIG. 18.

DETAILED DESCRIPTIONS

First embodiment and second embodiment of the synchronized contents information generating program, the synchronized contents information generating apparatus, and the synchronized contents information generating method according to the present invention will be explained in detail below with reference to the drawings.

A first embodiment of this invention will be explained below.

Figure 1:
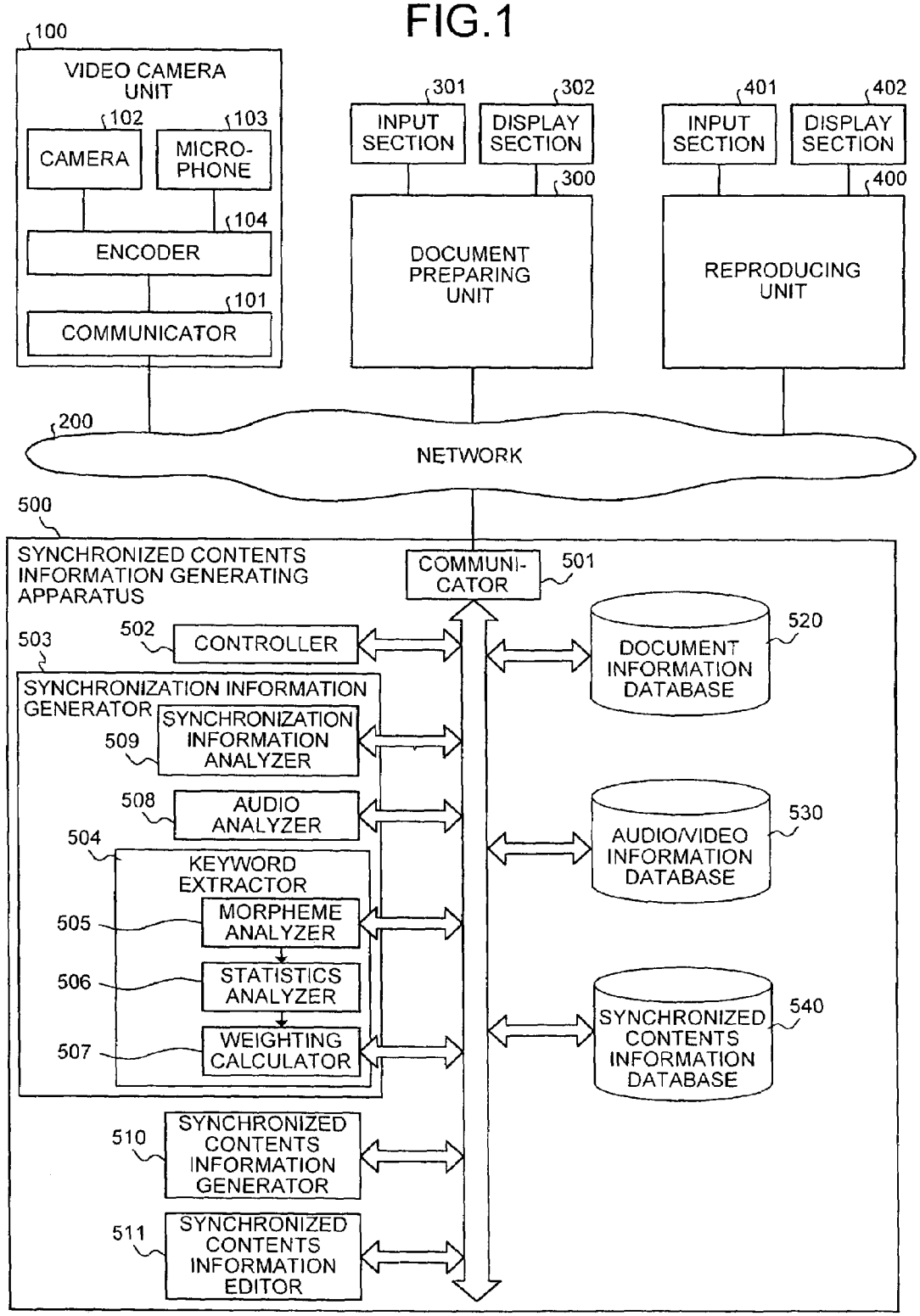
FIG. 1 is a block diagram showing a structure of a first embodiment of the present invention.

FIG. 1 is a block diagram showing the structure of the first embodiment. FIG. 1 shows a synchronized contents information generating system constructed of a video camera unit 100, a network 200, a document preparing unit 300, a reproducing unit 400, and a synchronized contents information generating apparatus 500.

Figure 23:
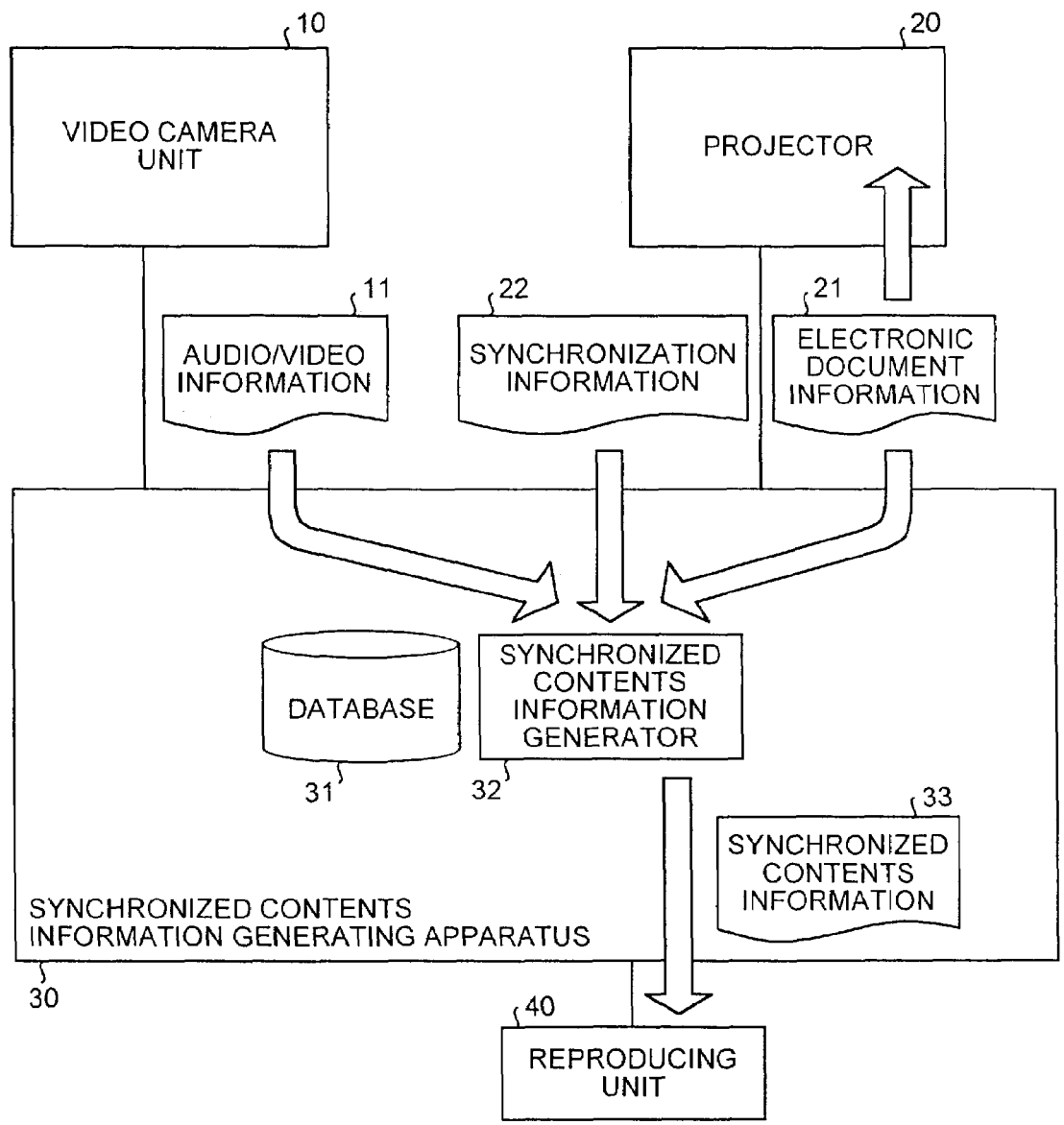
FIG. 23 is a block diagram showing the structure of a conventional synchronized contents information generating system.

The synchronized contents information generating system generates synchronized contents information in which document information consisting of a plurality of pages used at a meeting is synchronized with audio/video information that records how a presentation using the document goes on. That is, this system generates the synchronized contents information based on speech recognition of a presenter and analysis of keywords included in the document, without requiring any special apparatus like the conventional projector 20 (refer to FIG. 23).

The video camera unit 100 records how the presentation using the document goes on. In this video camera unit 100, a communicator 101 is connected to the network 200, and controls communications with the synchronized contents information generating apparatus 500 according to a predetermined communication protocol.

A camera 102 picks up video of the state of a presentation, and outputs video information. A microphone 103 converts the speech of a presenter into audio information. An encoder 104 converts the video information from the camera 102 into a video compression format like MPEG (Motion Picture Experts Group) 4, and converts the audio information from the microphone 103 into an audio compression format like MP3 (MPEG Audio Layer-3). Then, the encoder 104 outputs the converted information as audio/video information to the synchronized contents information generating apparatus 500.

The video camera unit 100 outputs the audio/video information to the synchronized contents information generating apparatus 500 in real time, or collectively after the meeting.

The document preparing unit 300 functions as a word processor or a drawing unit, and prepares an electronic document for presentation to output document information to the synchronized contents information generating apparatus 500. An input section 301 includes a keyboard, a mouse, and the like. A display section 302 is a display that displays an editing screen of a document and the like.

In the first embodiment, it is possible to generate synchronized contents information in the following two cases. One case is that the document preparing unit 300 prepares document information by the date of the presentation. The other case is that after the presentation is carried out using a handwritten document, the document preparing unit 300 prepares an electronic document from this hand-written document to prepare document information.

The reproducing unit 400 has a browser like SMIL reproduction software, and reproduces synchronized contents information (audio information, video information, and document information) generated by the synchronized contents information generating apparatus 500. The reproducing unit 400 has an input section 401 and a display section 402.

The synchronized contents information is viewed by those who are not able to attend the meeting. The display section 402 of the reproducing unit 400 displays both video and a document in a page unit (or in a block unit) in a chronologically synchronized state according to a reproduction screen format 600 (refer to FIG. 6).

The synchronized contents information generating apparatus 500 generates synchronization information based on the document information (refer to FIG. 2) stored in the document information database 520 and on the audio/video information (refer to FIG. 3) stored in the audio/video information database 530, and generates synchronized contents information.

The synchronization information is used to define a correlation between each page of the document information and a time zone on a reproduction time axis of the audio/video information. The synchronized contents information is information in which each page of the document information is correlated to a time zone on the reproduction time axis of the audio/video information based on the synchronization information.

In the synchronized contents information generating apparatus 500, a communicator 501 is connected to the network 200, and controls communications between the video camera unit 100, the document preparing unit 300, and the reproducing unit 400 according to a predetermined communication protocol.

A controller 502 controls each section of the apparatus. For example, the controller 502 controls databases. Specifically, the controller 502 stores the audio/video information from the video camera unit 100 into the audio/video information database 530.

The controller 502 stores the document information from the document preparing unit 300 into the document information database 520. Further, the controller 502 stores synchronized contents information generated in a synchronized contents information generator 510 to be described later into the synchronized contents information database 540.

A synchronization information generator 503 analyzes the audio/video information obtained from the audio/video information database 530 and the document information obtained from the document information database 520 to generate synchronization information. The synchronization information is information that indicates any time zone with which (or to which) each page or each block of the document information is synchronized (corresponds), on the time axis when the audio/video information is reproduced.

A keyword extractor 504 is constructed of a morpheme analyzer 505, a statistics analyzer 506, and a weighting calculator 507. The keyword extractor 504 executes morpheme analysis on a text in each page of the document information obtained from the document information database 520, and extracts proper nouns as keywords in a page unit.

The morpheme analyzer 505 executes morpheme analysis of document information. The statistics analyzer 506 measures a number of appearances of each keyword in each page, and analyzes statistics of an average number of appearances in each page. The weighting calculator 507 calculates a sequence of weighting coefficients to be described later based on the statistics.

An audio analyzer 508 (keyword appearance distribution measuring unit) executes audio analysis on audio information included in the audio/video information obtained from the audio/video information database 530 by using the sequence of the keywords in the document as keys extracted by the keyword extractor 504. The audio analyzer 508 then obtains a time sequence of appearances of keywords in the audio, of the result of the audio analysis, corresponding to the keywords in the document.

A synchronization information analyzer 509 obtains a sequence of display time of each page in the document information, as synchronization information, from the sequence of the above keywords and the time sequence of the appearances. A synchronized contents information generator 510 generates synchronized contents information described in SMIL or the like (refer to FIG. 5), from the document information, audio/video information, and the synchronization information. A synchronized contents information editor 511 has a function of editing the synchronized contents information generated by the synchronized contents information generator 510.

Figure 2:
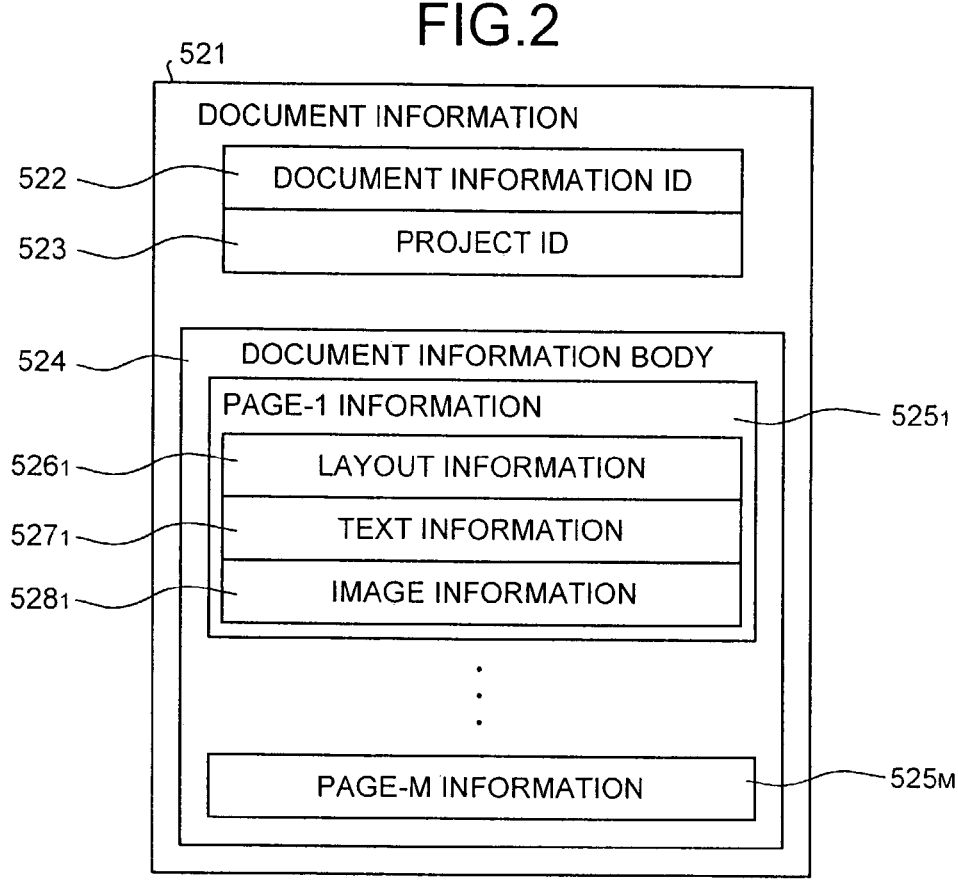
FIG. 2 is a diagram showing a structure of document information 521 stored in a document information database 520 shown in FIG. 1.

FIG. 2 is a diagram showing the structure of the document information 521 stored in the document information database 520 shown in FIG. 1. This document information 521 is output from the document preparing unit 300. In the document information 521, a document information ID 522 is an identifier for identifying the document. The number of pages of this document is M. A project ID 523 is an identifier for identifying a project in which the document is used.

A document information body 524 is document information for M pages, and is constructed of page-1 information $525_1$ to page-M information $525_M$. The page-1 information $525_1$ is document information of a first page, and is constructed of layout information $526_1$, text information $527_1$, and image information $528_1$.

The layout information $526_1$ is used for specifying a text of this page and a layout of images. The text information $527_1$ is information of a text described on this page, and the keywords are extracted from this text information $527_1$. The image information $528_1$ is information for images on this page.

Figure 3:
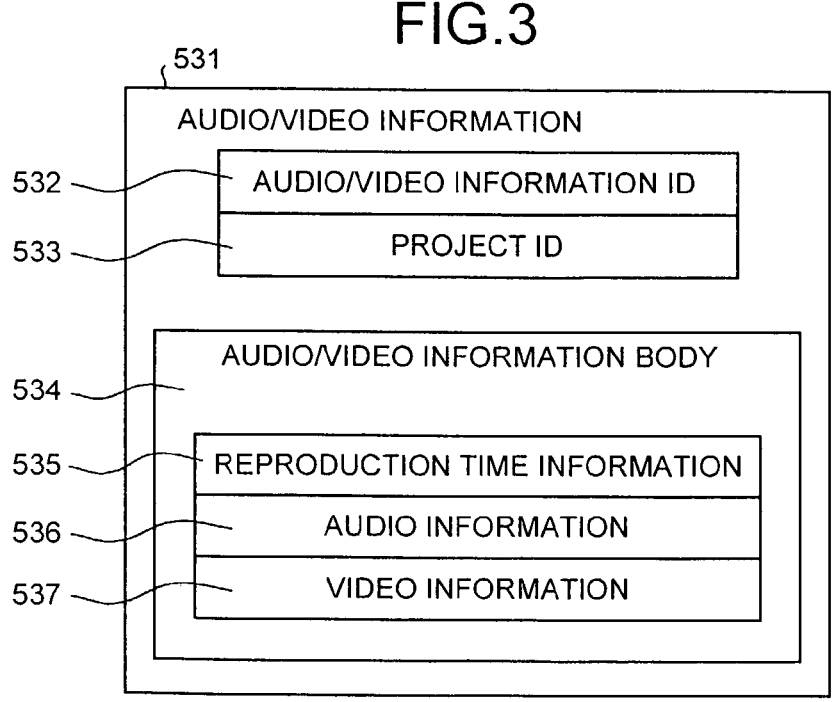
FIG. 3 is a diagram showing a structure of audio/video information 531 stored in an audio/video information database 530 shown in FIG. 1.

FIG. 3 is a diagram showing the structure of the audio/video information 531 stored in the audio/video information database 530 shown in FIG. 1. This audio/video information 531 is output from the video camera unit 100. In the audio/video information 531, an audio/video information ID 532 is an identifier for identifying the audio/video information.

A project ID 533 is the same as the project ID 523 (refer to FIG. 2). An audio/video information body 534 is a body of audio/video information, and is constructed of reproduction time information 535, audio information 536, and video information 537. The reproduction time information 535 is time information used for reproducing the audio/video information.

The audio information 536 corresponds to audio information from the microphone 103, and is audio information by a presenter (audio produced when he/she reads a document, and audio produced when he/she makes an explanation). The video information 537 corresponds to video information from the camera 102, and is information showing how a presentation goes on.

FIG. 4 is a diagram showing the structure of the synchronized contents information 541 stored in the synchronized contents information database 540 shown in FIG. 1. The synchronized contents information 541 is generated by the synchronized contents information generating apparatus 510. In the synchronized contents information 541, a synchronized contents information ID 542 is identifier information for identifying the synchronized contents. A project ID 543 corresponds to the project ID 523 (refer to FIG. 2) and the project ID 533 (refer to FIG. 3).

Authoring information 544 is constructed of a document information ID 545, an audio/video information ID 546, and synchronization information 547. The document information ID 545 corresponds to the document information ID 522 (refer to FIG. 2). The audio/video information ID 546 corresponds to the audio/video information ID 532 (refer to FIG. 3). The synchronization information 547 is input from the synchronization information analyzer 509.

A synchronized contents information body 548 is a body of synchronized contents information, and is described in SMIL as shown in FIG. 5. The synchronized contents information body 548 includes a starting time and a display ending time of synchronous display of each page in the document on a reproduction time axis of the audio/video information that are set therein. The synchronized contents information body 548 also includes a screen size of a reproduction screen format 600, a video display area 601, and a document display area 602 and the like shown in FIG. 6, which are set therein.

The reproduction screen format 600 is displayed on the display section 402 of the reproducing unit 400. Video information out of the audio/video information is displayed in the video display area 601. The audio information is reproduced by a speaker (not shown) of the reproducing unit 400 (refer to FIG. 1). The page of the document corresponding to the synchronization information is displayed in the document display area 602.

The operation of the first embodiment will be explained next with reference to flowcharts shown in FIG. 7 and FIG. 8 and with reference to FIG. 9 and FIG. 10. At a meeting, a paper document printed on a paper medium is distributed to the attendants.

When the meeting is started, a presenter implements a presentation by referring to the paper document. At this time, the presenter reads a part of the text described on each page by sequentially turning over the pages of the paper document. Particularly, a keyword representing characteristics of the page tends to be read frequently.

During the meeting, the video camera unit 100 shown in FIG. 1 outputs audio/video information corresponding to the speech of the presenter and the state of the presentation to the synchronized contents information generating apparatus 500 via the network 200. The controller 502 stores this audio/video information into the audio/video information database 530.

The document preparing unit 300 outputs document information corresponding to the paper document to the synchronized contents information generating apparatus 500 before or after the meeting. The controller 502 stores this document information into the document information database 520.

After the meeting, the synchronized contents information generating apparatus 500 generates the synchronized contents information. First, the keyword extractor 504 executes the keyword extraction to extract keywords from the document information stored in the document information database 520.

Specifically, after the document information is obtained from the document information database 520, the morpheme analyzer 505 executes the morpheme analysis in a page unit, and extracts proper nouns to be determined as keywords for each page. A set of keywords $k_1$ to $k_N$ that appear in all pages is expressed by equation (1) as a sequence K of keywords.

$$\text{Sequence of keywords } K=\{k_1, k_2, \ldots, k_N\} \tag{1}$$

Each page ($b_1$ to $b_M$) of the document information is expressed by equation (2) as a sequence B of document pages.

$$\text{Sequence of document pages } B=\{b_1, b_2, \ldots, b_M\} \tag{2}$$

The statistics analyzer 506 measures a number of appearances of each keyword in each page, and calculates statistics of an average number of the appearances μ in each page. The weighting calculator 507 calculates a sequence W of weighting coefficients expressed by the following equation (3) based on the statistics.

Sequence of weighting coefficients $W =$ (3)

$$\begin{bmatrix} w_{1'1'} & w_{1'2'} & \cdots, & w_{1'N} \\ w_{2'1'} & w_{2'2'} & \cdots, & w_{2'N} \\ & \vdots & & \\ \cdots, & w_{m'n'} & \cdots, & \\ & \vdots & & \\ w_{M'1'} & w_{M'2'} & \cdots, & w_{M'N'} \end{bmatrix}$$

The sequence W of the weighting coefficients becomes a sequence of M (a total number of pages)×N (a total number of keywords). An element $W_{m,n}$ of this sequence W of the weighting coefficients is calculated from the following equation (4), where $\mu_n$ represents an average number of appearances of a keyword $k_n$, and $x_m$ represents a number of appearances in a page $b_m$.

$$W_{m,n} = A \times (x_m - \mu_n) + B \times E(k_n) \quad (4)$$

The element $W_{m,n}$ is a weighting coefficient of the keyword $k_n$ in an m-th page. $E(k_n)$ represents a function that becomes 1 when the keyword $k_n$ is a title in the page $b_m$, a paragraph or item name, and a thick character or an underlined character, and becomes 0 in the other cases. A and B are constants for weighting coefficients. The keyword extractor 504 outputs the sequence K of the keywords and the sequence W of the weighting coefficients.

The audio analyzer 508 obtains the audio/video information from the audio/video information database 530. The audio analyzer 508 executes audio analysis on the audio information out of the audio/video information, by using each element in the sequence K of the keywords, and measures the appearance time of each keyword.

Specifically, the audio analyzer 508 decompresses the audio information that has been compressed by MP3 or the like, and converts the audio information to digital information by PCM (Pulse Code Modulation). The audio analyzer 508 extracts the appearance time of the keyword according to a known word spotting system, by using the converted information. The word spotting system is a speech technique to recognize only important words, not the whole pronounced words from the input speech.

The audio analyzer 508 sets the sequence of appearance of keywords $r_1$ to $r_p$ obtained by sorting the recognized keywords in a time sequence, as a sequence R of appearances of keywords (refer to the equation (5)). The audio analyzer 508 sets the sequence of appearance times $t_1$ to $t_p$ corresponding to the appearance keywords $r_1$ to $r_p$ respectively, as an appearance time sequence T (refer to the equation (6)).

Sequence of appearances of keywords $$R = \{r_1, r_2, \ldots, r_p\}, \text{where } r_p \in K \quad (5)$$

$$\text{Appearance time sequence } T = \{t_1, t_2, \ldots, t_p\} \quad (6)$$

Figure 9:
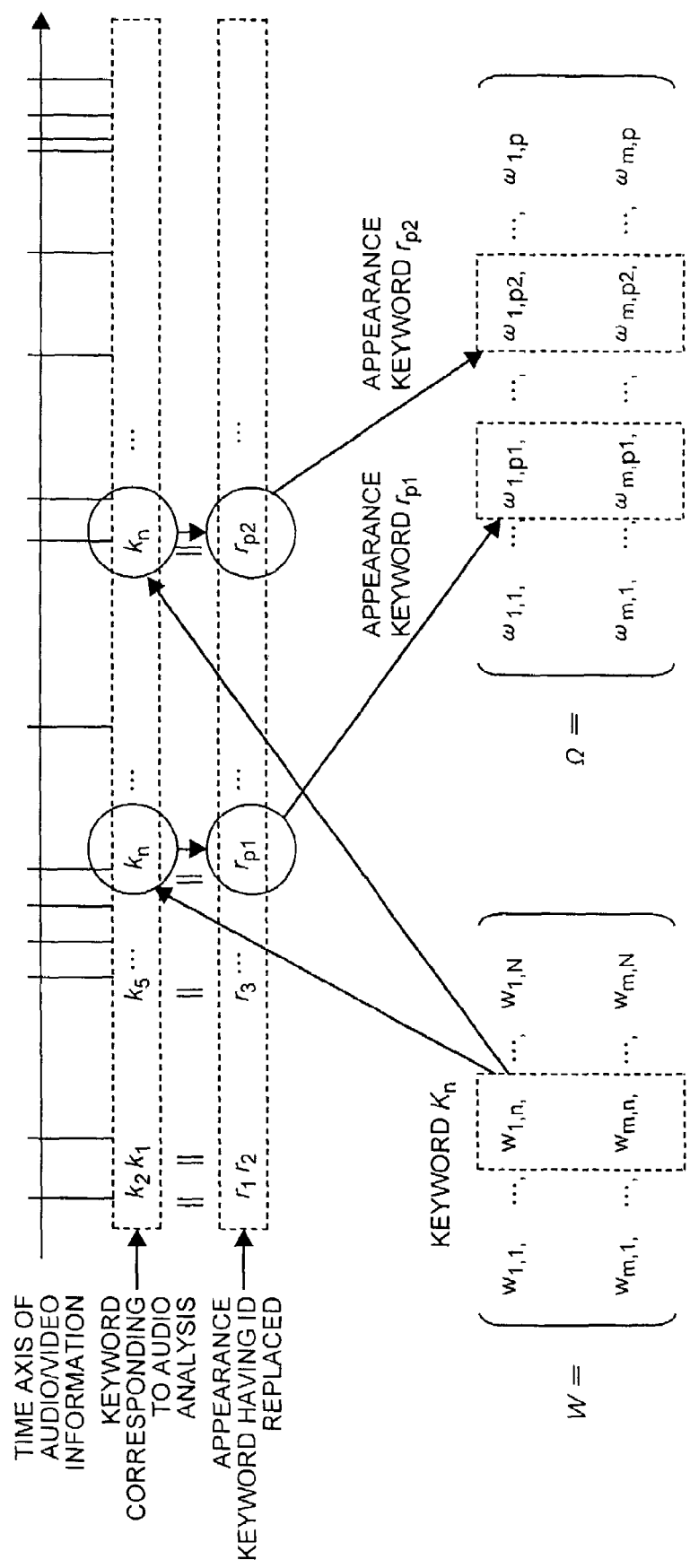
FIG. 9 is a diagram for explaining the operation of the first embodiment.

In other words, on the time axis of a reproduction of the audio/video information shown in FIG. 9, the appearance of keyword $r_1$ ("appearance keyword") included in the sequence R of the appearance keywords ("appearance keyword sequence R") means that this keyword has been pronounced by the presenter at the appearance time $t_1$ included in the appearance time sequence T.

The element of the appearance keyword sequence R has the same value as the element of the keyword sequence K. When the keyword appears a plurality of times in the audio information, a plurality of the same elements exist. The audio analyzer 508 obtains a sequence $\Omega$ of weighting coefficients for appearance keywords that is a sequence of a weighting coefficient $\omega_{m,p}$ corresponding to each keyword $r_p$, from the following equation (7).

Sequence of weighting coefficients for appearance keywords $$\Omega = \begin{bmatrix} \omega_{1'1'} & \omega_{1'2'} & \cdots, & \omega_{1'P} \\ \omega_{2'1'} & \omega_{2'2'} & \cdots, & \omega_{2'P} \\ & \vdots & & \\ \cdots, & \omega_{m'2'} & \cdots, & \\ & \vdots & & \\ \omega_{M'1'} & \omega_{M'2'} & \cdots, & \omega_{M'P} \end{bmatrix} \quad (7)$$

$\omega_{m,p} = W_{m,n}$, where n represents a value that satisfies a condition of $r_p = k_n$.

The weighting coefficient $\omega_{m,p}$ is a coefficient indicating a probability that the appearance keyword $r_p$ appears on the m-th page. The appearance keywords $r_p$ do not necessarily appear in the order of the indexes of the keyword sequence K, but may appear a plurality of times. Therefore, the sequence R of the appearance keywords in which indexes are replaced in the order of appearance frequency is prepared.

FIG. 9 shows a correlation between the sequence W of the weighting coefficients for the keyword sequence K and the sequence $\Omega$ of the weighting coefficients for the appearance keyword sequence R. Assume that the keyword $k_n$ has appeared at a p-first time and a p-second time in the audio information. At this time, an appearance keyword $r_{p1}$, and an appearance keyword $r_{p2}$ are equal to the keyword $k_n$.

Therefore, in the sequence $\Omega$ of weighting coefficients for appearance keywords, the appearance keyword $r_{p1}$, the appearance keyword $r_{p2}$, and a column p1 and a column p2 that express weighting coefficients, are a copy of a column n that expresses the weighting coefficient of the keyword $k_n$ in the sequence W of the weighting coefficients. It is possible to prepare the sequence $\Omega$ of weighting coefficients for appearance keywords, by copying the weighting coefficient of a corresponding keyword k for each of all elements of the appearance keyword sequence R.

The synchronization information analyzer 509 obtains a display starting time sequence S (refer to the equation (8)) that is a sequence of display starting times $s_1$ to $s_M$ of each page (from page 1 to page M) in the document information, based on the appearance keyword sequence R, the appearance time sequence T, and the sequence $\Omega$ of the weighting coefficients for the appearance keywords.

Display starting time sequence $$S = \{s_1, s_2, \ldots, s_M\}$$

$$\text{where}, s_1 < s_2 < \ldots < s_M \quad (8)$$

Figure 10:
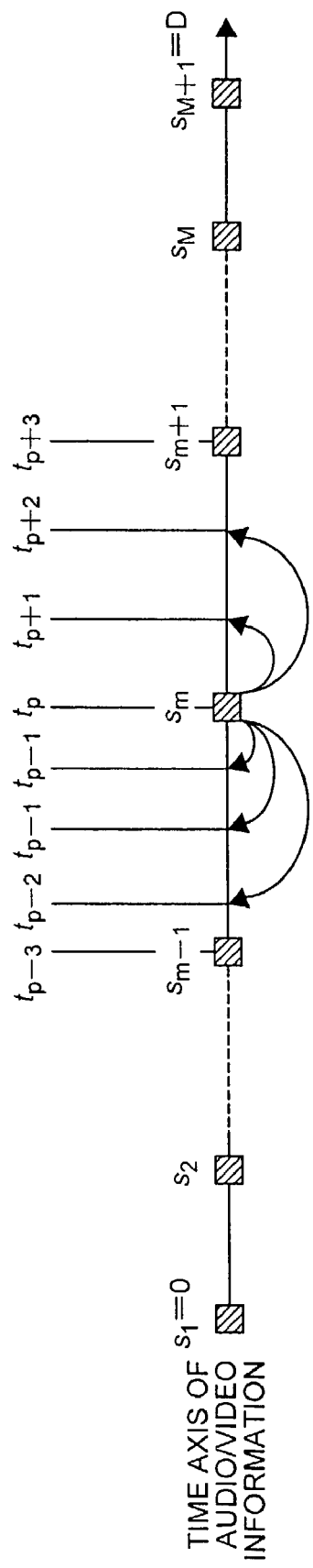
FIG. 10 is a diagram for explaining the operation of the first embodiment.

FIG. 10 shows a relationship between the time axis of a reproduction of the audio/video information and the display starting times $s_1$ to $s_M$. The display starting times $s_1$ to $s_M$ are synchronization information. For example, document information on the m-th page is displayed at a display starting time $s_m$. Specifically, on page $b_m$, the display is started at the display starting time $s_m$, and the display is finished at $s_{m+1}$.

An optimum combination of display starting times is defined as one that maximizes a value of an evaluation function F (S) expressed in the following equation (9).

$$F(S) = \sum_{m=1}^{M} \sum_{p=1}^{P} \omega_{m,p} \times \delta(t_p, S_m, S_{m+1}) \text{ where,} \quad (9)$$

$$\delta(t_p, S_m, S_{m+1}) = \begin{cases} 1, & \text{If } S_m \leq t_p < S_{m+1} \\ 0, & \text{Else} \end{cases}$$

The evaluation function F (S) is a function that takes a maximum value when the distribution of the appearance time of keywords according to the speech recognition coincides with the distribution of the appearance time of the keywords from the document information. The synchronization information analyzer 509 limits a value that the display starting time $s_m$ can take to the appearance time sequence T, and obtains the display starting time sequence S that locally maximizes the evaluation function F (S) based on a search algorithm to be described later.

Figure 8:
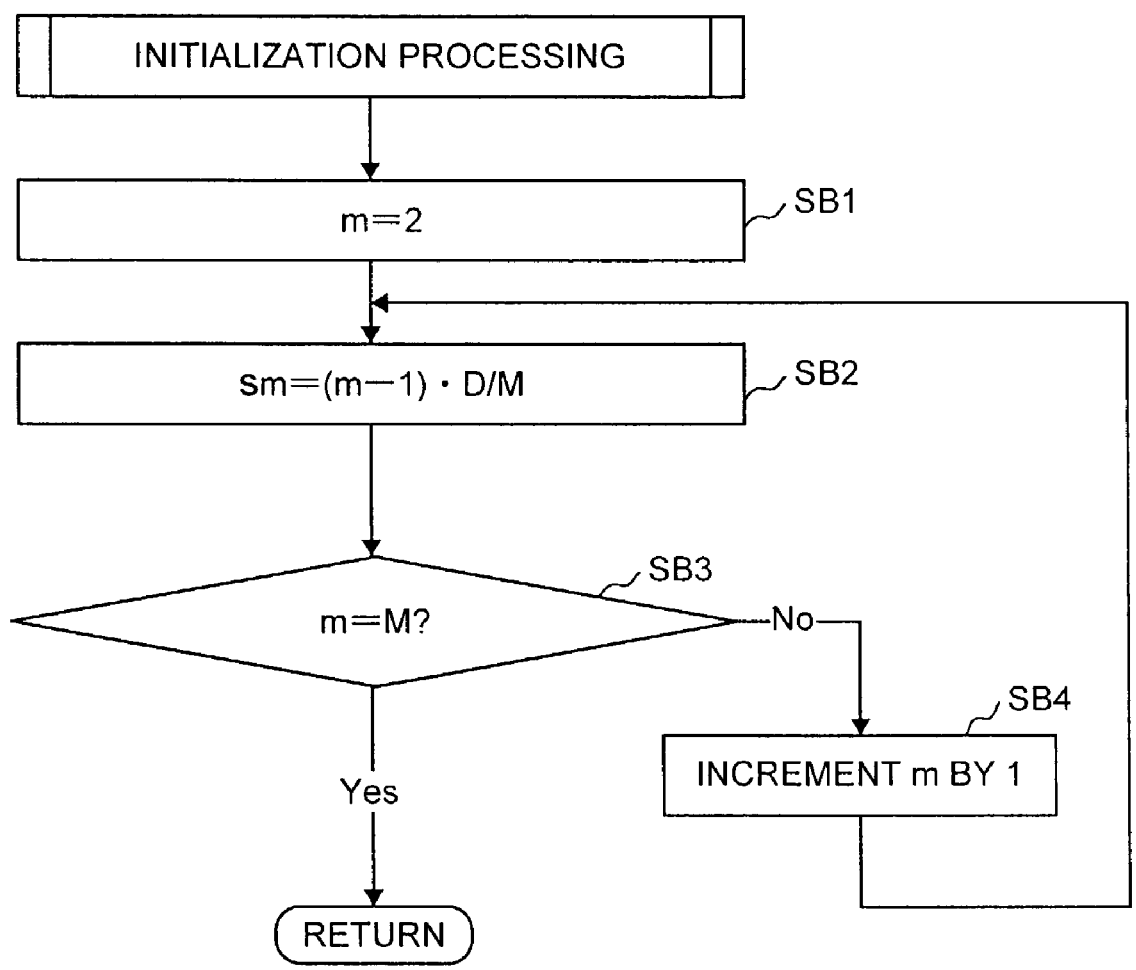
FIG. 8 is a flowchart for explaining an initialization processing shown in FIG. 7.

More specifically, at step SA1 shown in FIG. 7, the synchronization information analyzer 509 executes an initialization processing shown in FIG. 8. In this initialization processing, the display starting times $s_1$ to $s_M$ are set at equal time intervals on the time axis shown in FIG. 10. In other words, it is assumed that each page is turned over at equal time interval in the initialization processing.

At step SB1 of the initialization processing shown in FIG. 8, the synchronization information analyzer 509 substitutes 2 into m. At step SB2, the synchronization information analyzer 509 sets 0 to the display starting time $s_1$, and substitutes m (=2), a total reproduction time D of the audio/video information, and the number of pages M, into the following equation (10), thereby to obtain the display starting time $s_m$ ($s_2$ in this case).

$$S_m = (m-1) \times D/M \quad (10)$$

At step SB3, the synchronization information analyzer 509 decides whether m is equal to the number of pages M or not, and sets "No" as a result of the decision in this case. At step SB4, the synchronization information analyzer 509 increments m by 1. Thereafter, the synchronization information analyzer 509 repeats step SB2 onward. When a result of the decision made at step SB3 has become "Yes", the display starting times $s_1$ to $s_M$ shown in FIG. 10 are set at equal time intervals.

At step SA2 to step SA6 shown in FIG. 7, the synchronization information analyzer 509 shifts the display starting time $s_m$ in a period of $s_{m-1}$ to $s_{m+1}$ for m=2 to M shown in FIG. 10, to search for a period to calculate the evaluation function F (S). The keyword appearance time t (refer to the equation (6)) that maximizes a value of the evaluation function F (S) is set as a new display starting time $s_m$. This display starting time $s_m$ is shifted in the above period so as to satisfy a certain condition at any one of the appearance times $t_1$ to $t_p$ of the appearance time sequence T (refer to the equation (6)).

When the search for a period is finished for all m, one turn of search for a period ends. After one turn is ended, the synchronization information analyzer 509 compares the last evaluation function $F_o$ at the end time of the last turn with the current evaluation function F (S). When the increase of the value is within a range of an error Δ, the processing ends. In the other cases, the search for a period is executed again.

Specifically, at step SA2 shown in FIG. 7, the synchronization information analyzer 509 substitutes 0 into the last evaluation function $F_o$. At step SA3, the synchronization information analyzer 509 substitutes 2 into m. At step SA4, the synchronization information analyzer 509 shifts the display starting time $s_m$ in a period of $s_{m-1}$ to $s_{m+1}$ shown in FIG. 10 (in this case, $s_2$ is shifted in a period of $s_1$ to $s_3$). The keyword appearance time t (refer to the equation (6)) that maximizes a value of the evaluation function F (S) (refer to the equation (9)) is set as a new display starting time $s_m$.

At step SA5, the synchronization information analyzer 509 decides whether m is equal to the number of pages M or not, and sets "No" as a result of the decision in this case. At step SA7, the synchronization information analyzer 509 increments m by 1. Thereafter, at step SA4, the synchronization information analyzer 509 repeats the above searching by shifting the display starting time $s_m$ by one to the right on the time axis shown in FIG. 10.

When a result of the decision made at step SA5 has become "Yes", that is, when the search for a period of one turn has ended, the synchronization information analyzer 509 decides at step SA6 whether the current evaluation function F (S) has exceeded a sum of the last evaluation function $F_o$ and the error Δ or not. When a result of the decision is "Yes", the synchronization information analyzer 509 substitutes the current evaluation function F (S) into the last evaluation function $F_o$, and repeats the processing at step SA3 onward.

When a result of the decision made at step SA6 is "No", the synchronization information analyzer 509 ends a series of the processing. As a result, the starting times $s_1$ to $s_M$ of the display starting time sequence S (refer to the equation (8)) are fixed.

The synchronized contents information generator 510 generates the synchronized contents information 541 shown in FIG. 5 based on the display starting time sequence S from the synchronization information analyzer 509, the document information and the audio/video information. The synchronized contents information generator 510 stores the synchronized contents information 541 into the synchronized contents information database 540.

In this synchronized contents information 541, "begin=$s_1$ of the data on the first page of the electronic document" corresponds to the display starting time $s_1$ included in the display starting time sequence S. Therefore, the display of the document information on the first page is started at the display starting time $s_1$ on the time axis of the audio/video information shown in FIG. 10, and the display is finished at end=$s_2$.

When there is a request for reproduction from the reproducing unit 400, the controller 502 reads the synchronized contents information 541 (refer to FIG. 5) from the synchronized contents information database 540, and transmits this information 541 to the reproducing unit 400.

The reproducing unit 400 reproduces the audio/video information and the document information based on the reproduction screen format 600 corresponding to the synchronized contents information 541. Each page of the document is sequentially displayed in parallel with the video at timings based on the display starting time sequence S.

As explained above, according to the first embodiment, the video camera unit 100 picks up video and records the state of the meeting at which the document is used. The keyword appearance distribution in the order in which each keyword extracted by the keyword extractor 504 appears, is measured based on the information for the recorded audio and video, and the synchronized contents information is generated. The synchronized contents information allows the display section 402 to display the document information in synchronism with the audio/video information. Therefore, it is possible to generate synchronized contents information without requiring any particular equipment like a projector.

In the first embodiment, the method of setting the display starting times $s_1$ to $s_M$ at equal intervals as initial values in the initialization processing (refer to FIG. 10) shown in FIG. 8, is explained. It is also possible to set the display starting times $s_1$ to $s_M$ as initial values, by utilizing character modification like an underline, a thick character, and a font size, and also utilizing layout information in the document such as a title and a chapter name, relating to the keywords in the document.

A first modification of the first embodiment will be explained below. In the first modification, the morpheme analyzer 505 shown in FIG. 1 extracts as keywords a page title, an underline, a thick character, and a word having an extremely larger font size as compared to other characters included in the document information. At the same time, a set of keyword types $a_1$ to $a_N$ is set as a keyword type sequence A expressed by the following equation (11).

$$\text{Keyword type sequence } A = \{a_1, a_2, \ldots, a_N\} \text{ where,} \quad (11)$$

$$a_n = \begin{cases} 1, & \text{Page title} \\ 2, & \text{Modified - characters} \\ 0, & \text{Other keywords} \end{cases}$$

In the keyword type $a_n$, code 1 denotes a case such that the keyword type is a page title. Code 2 denotes a case such that the keyword type is a word with modified characters. Code 0 denotes a case such that the keyword is one other than the page title and the word with modified characters.

Figure 13:
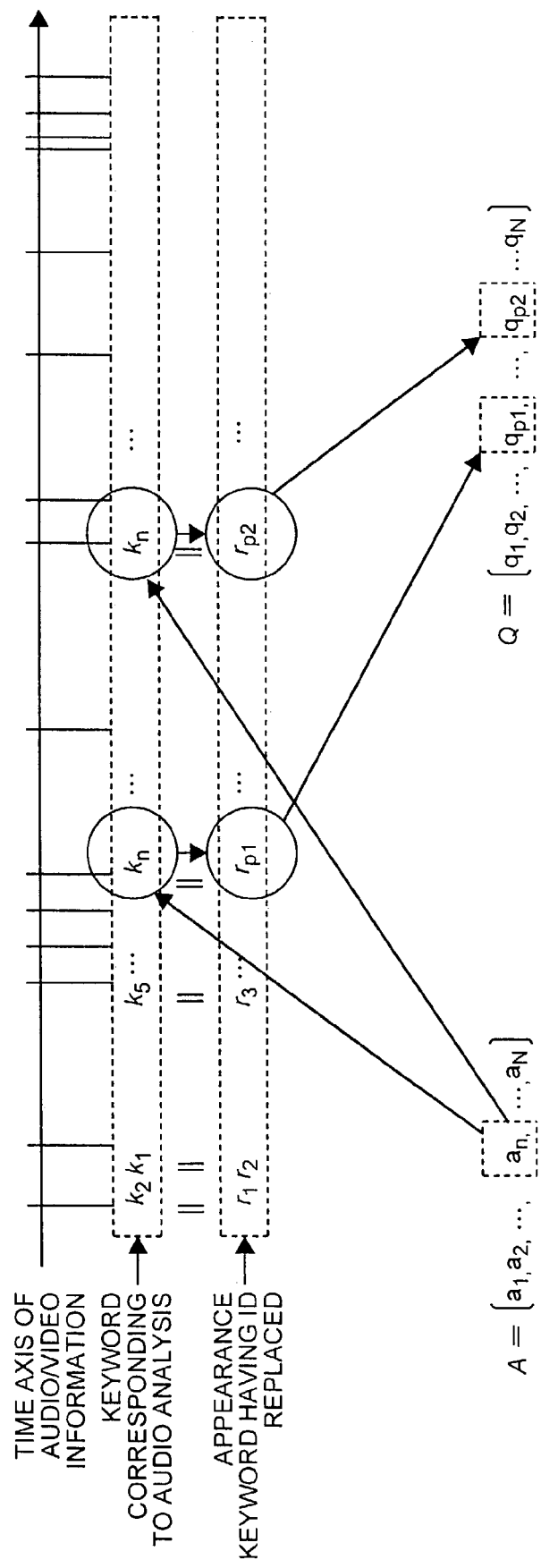
FIG. 13 is a diagram for explaining the operation of the first modification of the first embodiment.

In the first modification, the audio analyzer 508 obtains the appearance keyword sequence R (refer to the equation (5)), and the appearance time sequence T (refer to the equation (6)), in the same manner as that described above. The audio analyzer 508 expresses the sequence of appearance keyword types $q_1$ to $q_P$ obtained by sorting the elements of a keyword type sequence A shown in FIG. 13, as sequence Q of appearance keyword types ("appearance keyword type sequence") as given by the following equation (12).

Appearance keyword type sequence $$Q = \{q_1, q_2, \ldots, q_P\} \quad (12)$$

$q_p = a_n$, where n is a value that satisfies a condition of $r_P = k_n$.

The synchronized contents information generator 510 determines the display starting time $s_m$ at which the display of the m-th page ($b_m$) is started according to a rule shown in FIG. 14, from the appearance keyword sequence R, the appearance time sequence T, and the appearance keyword type sequence Q. Rule 1 is such that the appearance keyword type $q_P$ has a value of 1 or 2.

Rule 2 is such that the appearance keyword $r_P$ is a unique keyword that appears only in the m-th page. Rule 3 is such that the appearance keyword satisfies one of the following rules 3-1 and 3-2". The rule 3-1 is such that there is no appearance keyword $r_u$ that becomes the appearance keyword $r_P = r_u$ in the appearance keyword sequence R. The rule 3-2 is such that when there is an appearance keyword $r_u$ that becomes the appearance keyword $r_P = r_u$ in the appearance keyword sequence R, p and u satisfy a relationship of $0 < t_u - t_p < \Delta t$.

When there are m and p that simultaneously satisfy the above conditions, the time $t_p$ is set as an initial value of the display starting time $s_m$. It is noted that $\Delta t$ is a sufficiently small time. For example, $\Delta t$ is set as 10% or below of an average display time per one page (D/M). In the present rules, it is not always possible to fix the values of all the display starting times $s_m$. Therefore, for the display starting times $s_m$ that have not been fixed, a value is fixed by uniformly allocating the period that has not been fixed.

Figure 11:
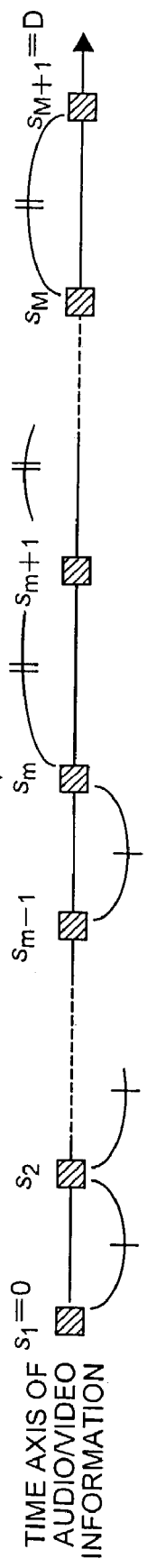
FIG. 11 is a diagram for explaining the operation of a first modification of the first embodiment.

FIG. 11 shows an example in which the value of a display starting time $s_m$ can be fixed at only one point on the time axis of the audio/video information. For the period that has not been fixed around this point, the initial value of the display starting time is uniformly allocated.

Figure 12:
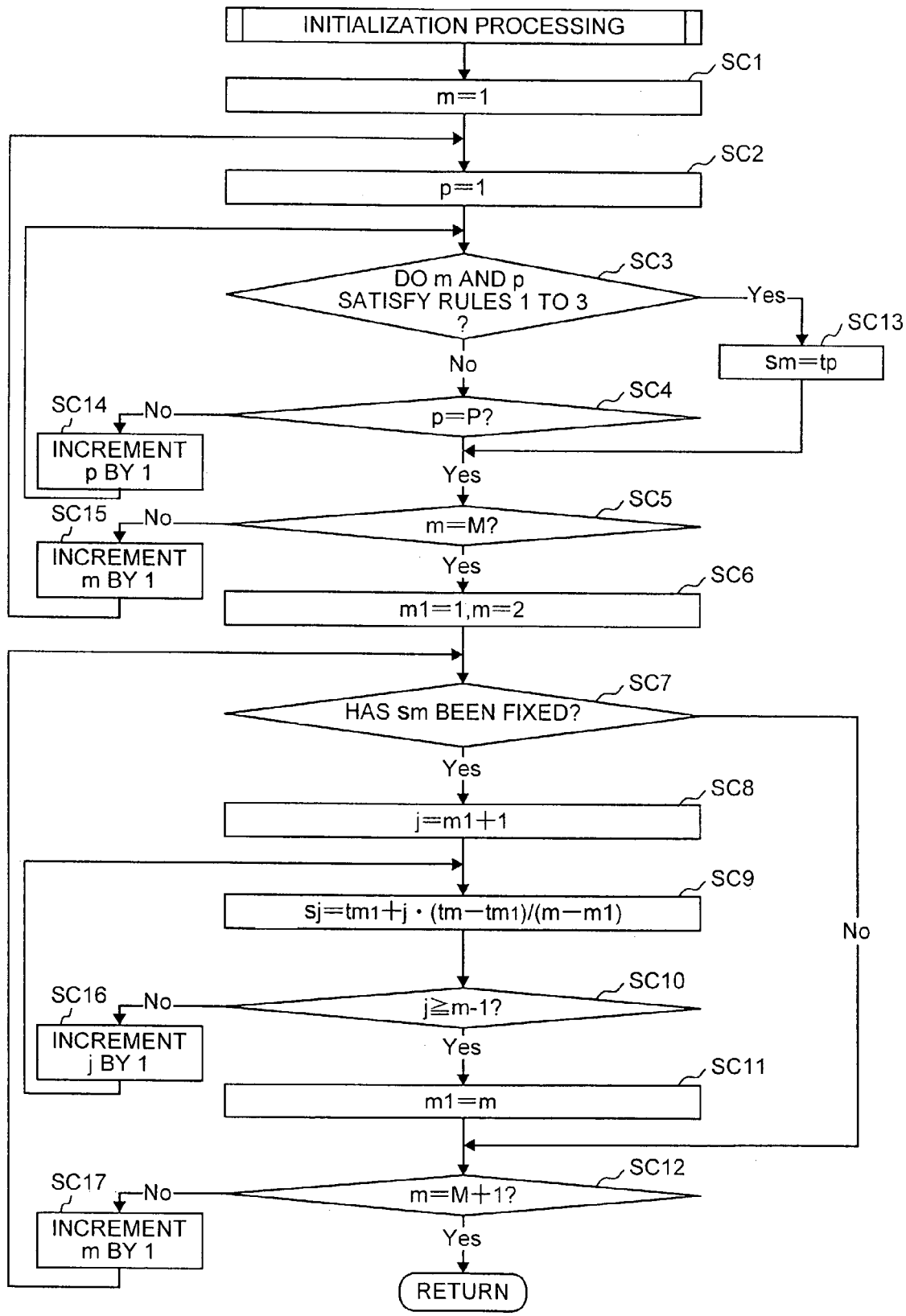
FIG. 12 is a flowchart for explaining the operation of the first modification of the first embodiment.

Specifically, in the first modification, the synchronization information analyzer 509 executes the initialization processing shown in FIG. 12 in place of the initialization processing shown in FIG. 8. At step SC1 as shown in FIG. 12, 1 is substituted into m. At step SC2, 1 is substituted into p. At step SC3, the synchronization information analyzer 509 decides whether m and p satisfy the rules 1 to 3 (refer to FIG. 14) or not. A result of the decision made becomes "No" in this example. When a result of the decision made at step SC3 is "Yes", the synchronization information analyzer 509 substitutes the appearance time $t_p$ into the display starting time $s_m$, at step SC13.

At step SC4, the synchronization information analyzer 509 decides whether p is equal to P or not. A result of the decision made becomes "No" in this example. At step SC14, p is incremented by 1, and the processing at step SC3 onward is repeated. When a result of the decision made at step SC4 is "Yes", the synchronization information analyzer 509 decides whether m is equal to the total number of pages M or not, at step SC5. A result of the decision made becomes "No" in this example. At step SC15, m is incremented by 1, and the processing at step SC2 onward is repeated.

When a result of the decision made at step SC5 is "Yes", 1 is substituted into m1, and 2 is substituted into m at step SC6. At step SC7, the synchronization information analyzer 509 decides whether the display starting time $s_m$ has been fixed. When a result of the decision made becomes "No", the synchronization information analyzer 509 makes a decision at step SC12.

On the other hand, when a result of the decision made at step SC7 is "Yes", (m1+1) is set to j at step SC8. At step SC9, the synchronization information analyzer 509 calculates $s_j = t_{m1} + j \cdot (t_m + t_{m1})/(m - m1)$. At step SC10, the synchronization information analyzer 509 decides whether j is equal to or greater than (m−1) or not. A result of the decision made becomes "No" in this example. At step SC16, j is incremented by 1, and the processing at step SC9 onward is repeated.

When a result of the decision made at step SC10 is "Yes", m is substituted into m1 at step SC11. At step SC12, the synchronization information analyzer 509 decides whether m is equal to (M+1) or not. A result of the decision made becomes "No" in this example. At step SC17, m is incremented by 1, and the processing at step SC7 onward is repeated. When a result of the decision made at step SC12 is "Yes", the synchronization information analyzer 509 executes the processing at step SA2 (refer to FIG. 7) onward.

As explained above, according to the modification of the first embodiment, the audio/video information is synchronized with the document information based on the keyword type information included in the document information. Therefore, it is possible to establish synchronization between the two according to a keyword type (e.g., a title, and an emphasized character).

A second embodiment of this invention will be explained below.

Figure 15:
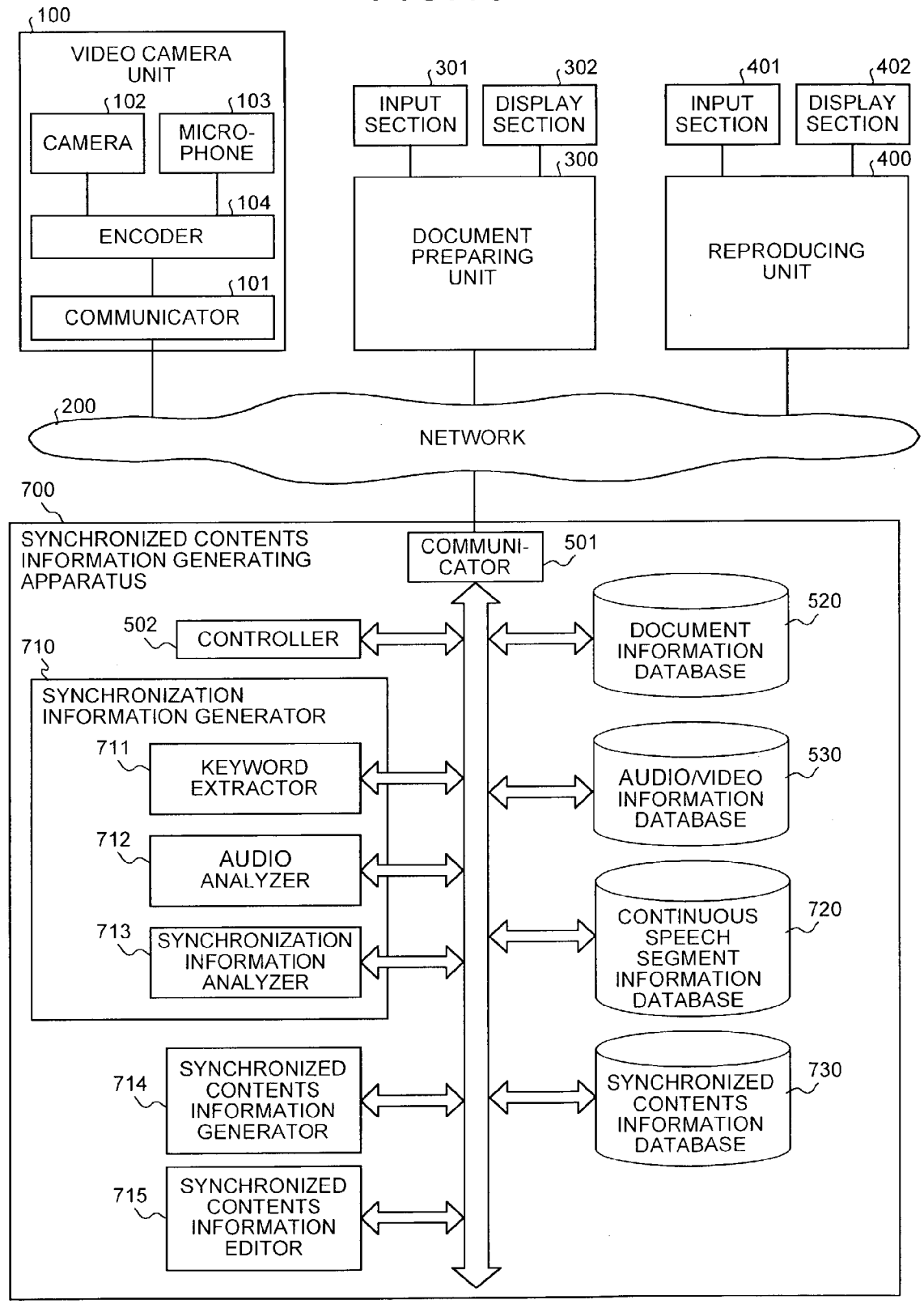
FIG. 15 is a block diagram showing a structure of a second embodiment of the present invention.

FIG. 15 is a block diagram showing the structure of the second embodiment of the present invention. In this figure, the same reference numerals are assigned to those corresponding to the sections in FIG. 1, and the explanation thereof will be omitted. In this figure, a synchronized contents information generating apparatus 700 is provided in place of the synchronized contents information generating apparatus 500 shown in FIG. 1.

The synchronized contents information generating apparatus 700 is provided with a synchronization information generator 710, a synchronized contents information generator 714, a synchronized contents information editor 715, a continuous speech segment information database 720, and a synchronized contents information database 730, in place of the synchronization information generator 503, the synchronized contents information generator 510, the synchronized contents information editor 511, and the synchronized contents information database 540.

The synchronization information generator 710 analyzes the audio/video information obtained from the audio/video information database 530 and the document information obtained from the document information database 520 to generate synchronization information. The synchronization information indicates any time zone with which (to which) each document block (e.g., each page) of the document information is synchronized (corresponds), on the time axis when the audio/video information is reproduced.

Figure 20:
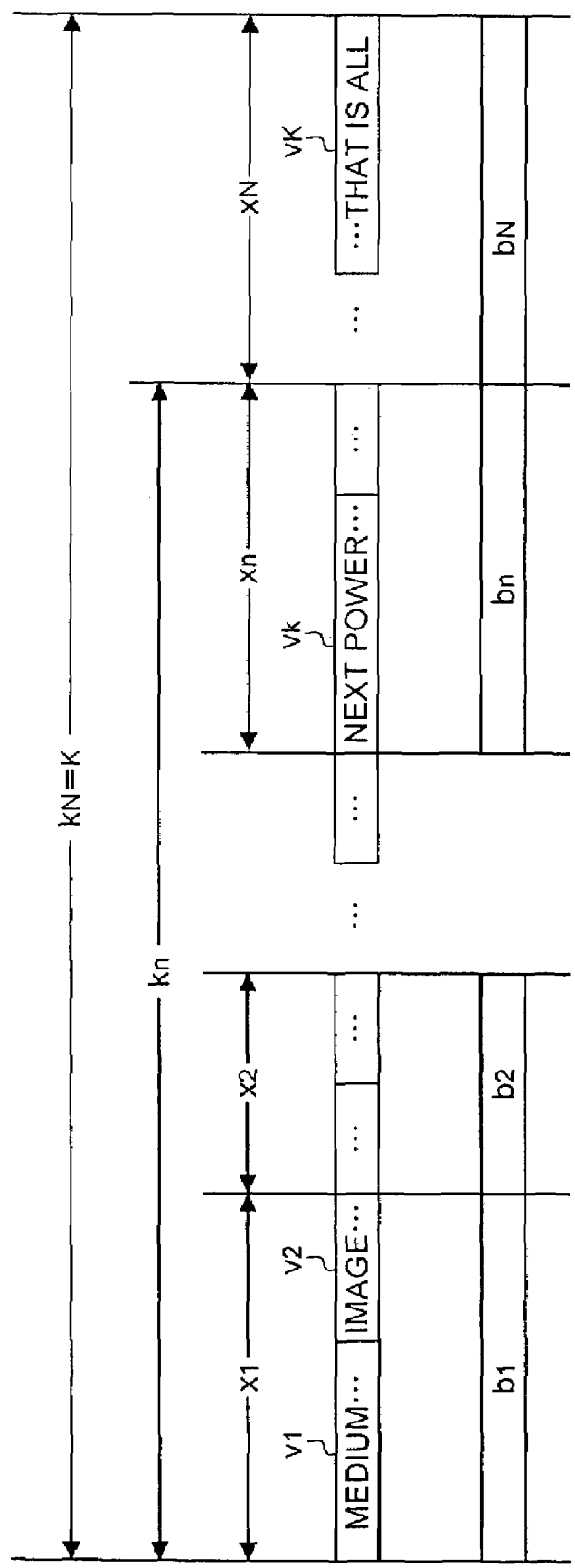
FIG. 20 is a diagram for explaining the operation of the second embodiment.

In the synchronization information generator 710, a keyword extractor 711 (document block dividing unit) divides document information obtained from the document information database 520 into N document blocks $b_n$ (n=1, 2, ..., N), as shown in FIG. 20.

The keyword extractor 711 executes morpheme analysis on each document block $b_n$, extracts a noun, and sets the noun as a keyword. The keyword extractor 711 calculates a keyword weighting coefficient $W_{n,\theta}$ as an index indicating a probability that a sentence including the keyword belongs to the document $b_n$, using an equation described later.

Figure 16:
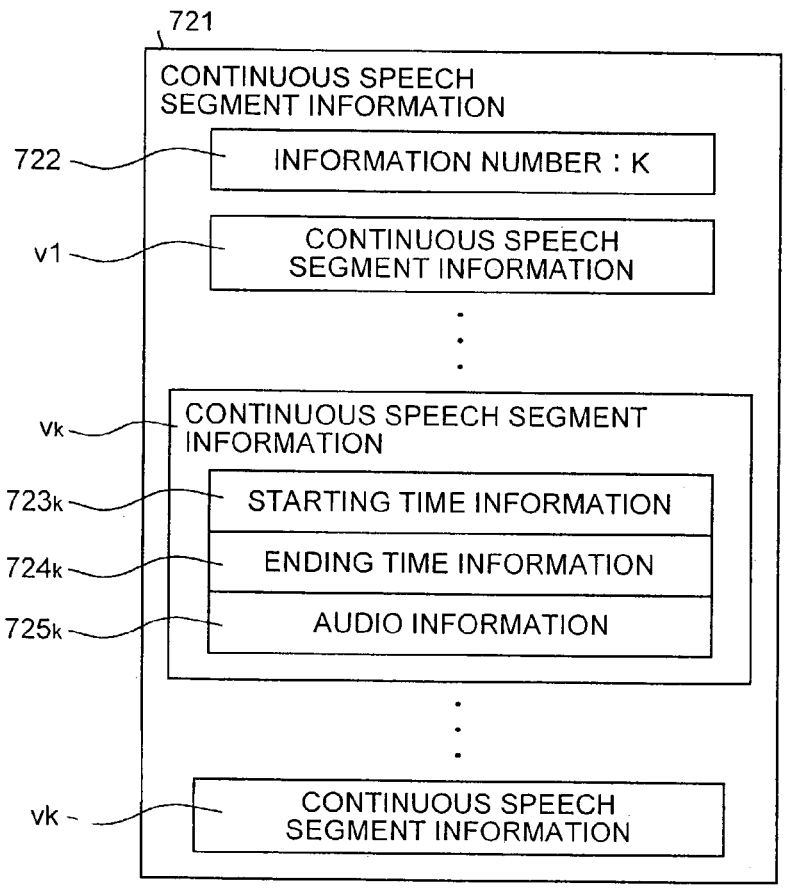
FIG. 16 is a diagram showing a structure of continuous speech segment information 721 stored in a database 720 for the continuous speech segment information shown in FIG. 15.
Figure 17:
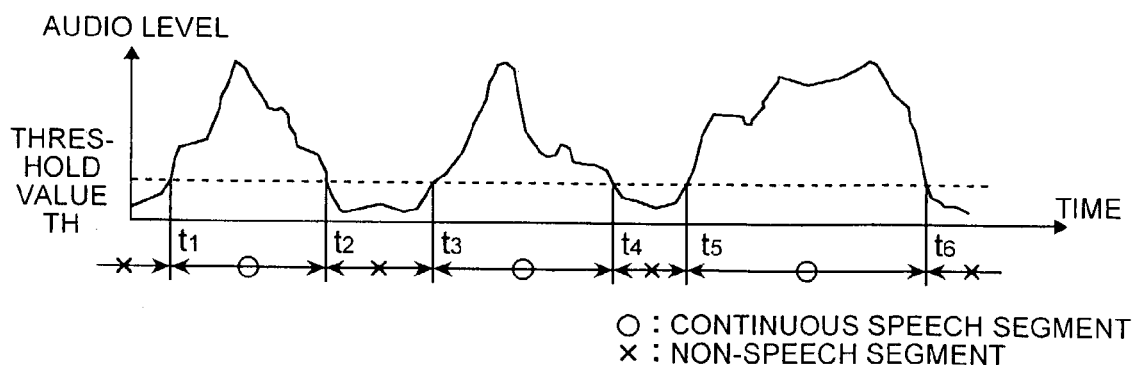
FIG. 17 is a diagram for explaining the principle of generating the continuous speech segment information in an audio analyzer 712 shown in FIG. 15.

The audio analyzer 712 (audio segmenting unit) compares an audio level of audio information with a threshold value TH, sets a segment in which the audio level exceeds the threshold value TH as a continuous speech segment (indicated by a circle in FIG. 17), as shown in FIG. 17, and generates continuous speech segment information 721 (refer to FIG. 16) corresponding to this continuous speech segment.

The audio analyzer 712 measures a speech frequency $\beta_{k,n}$, $\theta$ of a keyword $\theta$ that is in the document block $b_n$, for the audio information included in the continuous speech segment information, according to a method described later.

A synchronization information analyzer 713 (distributing unit) distributes K pieces of continuous speech segment information $v_1$ to $V_k$ to N document blocks $b_1$ to $b_n$ by $x_n$ pieces from the header, according to a dynamic programming method described later, as shown in FIG. 20.

The probability of distribution is given by the following equation (13).

$$E(x_1, x_2, \ldots, x_N) = \sum_{n=1}^{N} g_n(k_{n-1}, x_n) \quad (13)$$

In the equation (13), an optimum distribution becomes a combination of $(x_1, x_2, \ldots, x_N)$ that maximizes an evaluation function $E(x_1, x_2, \ldots, x_N)$. A function $g_n(k_{n-1}, x_n)$ expresses a profit (probability of distribution) obtained when $x_n$ continuous speech segments following $k_{n-1}$ are distributed to the document block $b_n$.

The synchronization information analyzer 713 obtains a sequence of a display time of each document block, as synchronization information. The synchronized contents information generator 714 generates synchronized contents information (refer to FIG. 19) described in SMIL or the like, from the document information, the audio/video information, and the synchronization information.

FIG. 16 is a diagram showing the structure of the continuous speech segment information 721 stored in the continuous speech segment information database 720 shown in FIG. 15. This continuous speech segment information 721 is generated in the audio analyzer 712.

The continuous speech segment information 721 is composed of information number 722 and continuous speech segment information $v_1, \ldots, v_k$. The information number 722 shows a number K of the continuous speech segment information $v_1, \ldots, v_k$. These pieces of continuous speech segment information $v_1, \ldots, v_k$ are information corresponding to respective continuous speech segments (indicated by a circle in FIG. 17) in which the audio level of audio information included in the audio/video information exceeds the threshold value TH as shown in FIG. 17. In this continuous speech segment, a presenter is continuously speaking.

On the other hand, a segment in which an audio level is at or below the threshold value TH corresponds to a portion of a sentence break or the like, and this is a non-speech segment in which there is no speech of a presenter (indicated by a cross in FIG. 17).

Referring back to FIG. 16, the continuous speech segment information $v_k$ is composed of starting time information $723_k$, ending time information $724_k$, and audio information $725_k$. Other continuous speech segment information $v_1$ and $v_K$ are also composed of starting time information, ending time information, and audio information, like the continuous speech segment information $v_k$.

Figure 18:
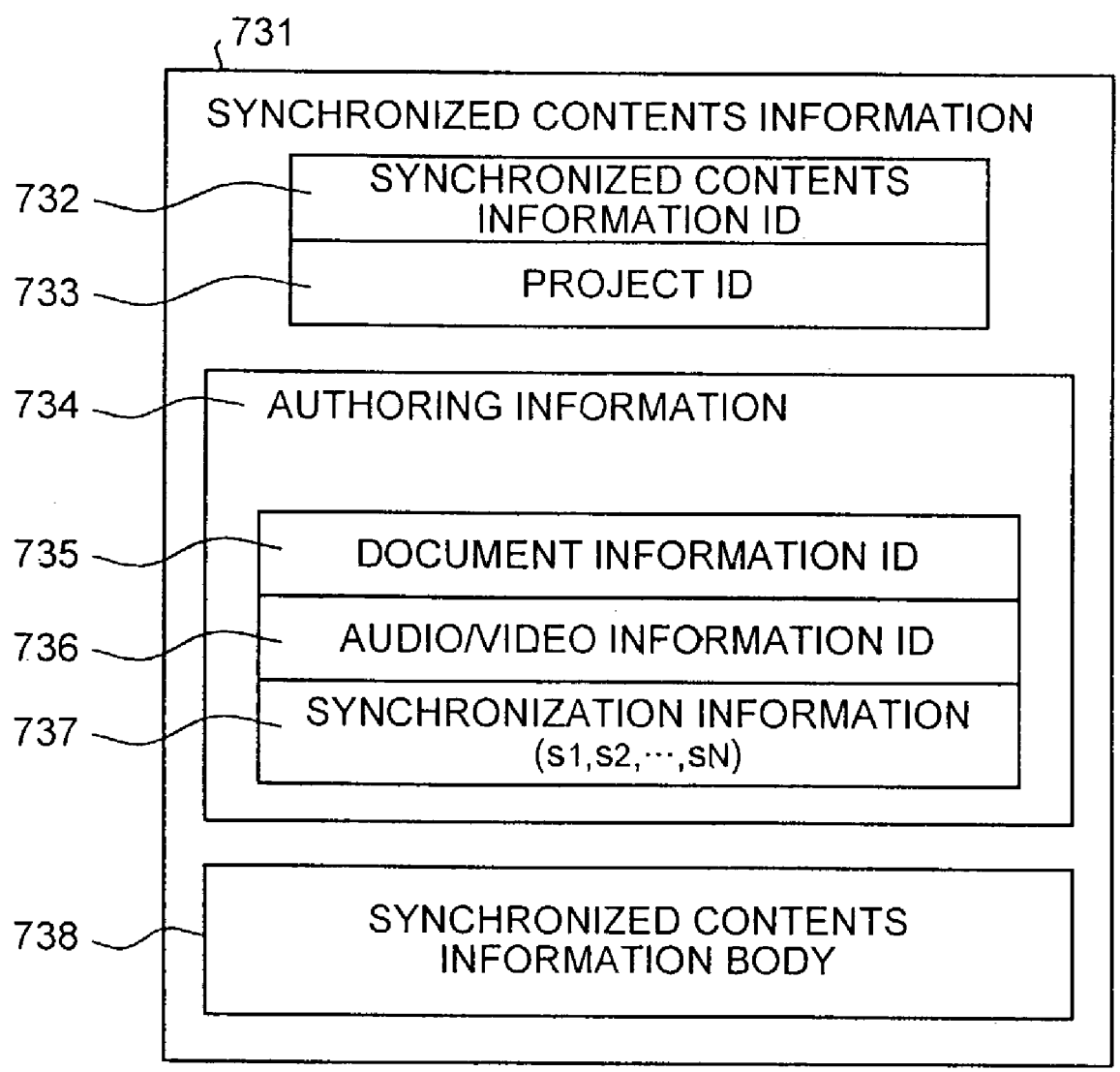
FIG. 18 is a diagram showing a structure of synchronized contents information 731 stored in a synchronized contents information database 730 shown in FIG. 15.

FIG. 18 is a diagram showing the structure of synchronized contents information 731 stored in the synchronized contents information database 730 shown in FIG. 15. The synchronized contents information 731 is generated by the synchronized contents information generator 714.

The synchronized contents information 731 is composed of a synchronized contents information ID 732, a project ID 733, authoring information 734, and a synchronized contents information body 738. In the synchronized contents information 731, the synchronized contents information ID 732 is identifier information for identifying the synchronized contents. The project ID 733 corresponds to the project ID 523 (refer to FIG. 2) and the project ID 533 (refer to FIG. 3).

The authoring information 734 is constructed of a document information ID 735, an audio/video information ID 736, and synchronization information 737. The document information ID 735 corresponds to the document information ID 522 (refer to FIG. 2). The audio/video information ID 736 corresponds to the audio/video information ID 532 (refer to FIG. 3). The synchronization information 737 is input from the synchronization information analyzer 713.

The synchronized contents information body 738 is a body of synchronized contents information, and is described in SMIL as shown in FIG. 19. In the synchronized contents information body 738, the followings are set, such as a starting time and a display ending time of synchronous display of each page of the document on a reproduction time axis of the audio/video information, and the screen size, the video display area 601, and the document display area 602 of the reproduction screen format 600 shown in FIG. 6.

The operation of the second embodiment will be explained with reference to a flowchart shown in FIG. 21. At a meeting, a paper document printed on a paper medium is distributed to the attendants.

The document preparing unit 300 outputs document information corresponding to the paper document to the synchronized contents information generating apparatus 500 before or after the meeting. The document information is stored in the document information database 520 by the controller 502.

When the meeting is started, a presenter makes a presentation by referring to the paper document. At this time, the presenter reads a part of the text described on each page by sequentially turning over pages of the paper document. Particularly, the presenter tends to frequently read keywords that show characteristics of this page.

During the meeting, the video camera unit 100 shown in FIG. 15 outputs audio/video information corresponding to the speech of the presenter and the state of the presentation to the synchronized contents information generating apparatus 700 via the network 200. This audio/video information is stored in the audio/video information database 530 by the controller 502.

After the meeting, at step SD1, the keyword extractor 711 reads in document information from the document information database 520. At step SD2, the keyword extractor 711 divides the document information into N document blocks $b_n$ (n=1, 2, . . . ,N). For the document bock $b_n$, a synchronous document unit such as one page or one paragraph is used.

At step SD3, the keyword extractor 711 executes morpheme analysis on each document block $b_n$, and extracts a noun to set the noun as a keyword. A set of keywords extracted from the document blocks $b_n$ is set as a keyword set $\Theta_n$.

At step SD4, the keyword extractor 711 calculates the keyword weighting coefficient $W_{n,\theta}$ as an index indicating a probability that a sentence including a keyword $\theta$ ($\theta \in \Theta_n$) belongs to the document $b_n$. Specifically, when a frequency with which the keyword $\theta$ appears in the document block $b_n$ is $\epsilon_{n,\phi}$, the keyword weighting coefficient $W_{n,\theta}$ is given by the following equation (14).

$$w_{n,\theta} = \max\left[0.0, (-0.5, +1.0, -0.5)\begin{pmatrix} \varepsilon_{n-1,\theta} \\ \varepsilon_{n,\theta} \\ \varepsilon_{n+1,\theta} \end{pmatrix}\right] \quad (14)$$

In the equation (14), it is meant that the keyword weighting coefficient $W_{n,\theta}$ becomes small when the keyword $\theta$ appears in the document block $b_n$ in the frequency $\epsilon_{n,\theta}$, and also when the keyword $\theta$ appears in the document blocks ($b_{n-1}$, $b_{n+1}$) before and after the document block $b_n$ in the similar frequency to the above.

On the contrary, when a keyword that does not appear in the document blocks ($b_{n-1}$, $b_{n+1}$) before and after the document block $b_n$ appears frequently in only the document block $b_n$, the keyword weighting coefficient $W_{n,\theta}$ becomes a large value. In other words, in the equation (14), the probability that the keyword $\theta$ appears in the document block $b_n$ is determined in consideration of appearance of the keyword in the document blocks ($b_{n-1}$, $b_{n+1}$) before and after this document block.

According to the equation (14), a frequency with which a keyword appears in the document block is obtained, and a keyword weighting coefficient is obtained based on this frequency and frequencies in the document blocks before and after this document block. Therefore, it is possible to obtain a keyword weighting coefficient with which a keyword having high locality with respect to document blocks is heavily weighted.

At step SD5, the audio analyzer 712 reads in audio information included in audio/video information from the audio/video information database 530. At step SD6, the audio analyzer 712 compares an audio level of the audio information with the threshold value TH, and sets a segment in which the audio level exceeds the threshold value TH as a continuous speech segment (indicated by a circle in FIG. 17), as shown in FIG. 17.

The audio analyzer 712 sets starting time information (for example, t1), ending time information (for example, t2), and audio information as K pieces of continuous speech segment information $v_1$, . . . , $v_k$, . . . $v_K$, and sets the information number 722 to K, as shown in FIG. 16. The audio analyzer 712 generates these pieces of information as the continuous speech segment information 721, and stores them into the continuous speech segment information database 720 shown in FIG. 15.

At step SD7, the audio analyzer 712 calculates the speech frequency $\beta_{k,n}$, $\theta$ of the keyword $\theta$ ($\theta \in \Theta_n$) in the document block $b_n$ extracted by the keyword extractor 711 at step SD3, for the audio information included in the continuous speech segment information $v_k$ shown in FIG. 16, for example. Whether the keyword $\theta$ has been spoken in the audio information included in the continuous speech segment information $v_k$ is detected by a speech recognition processing.

For example, in the word spotting as a known speech recognition processing, a keyword set $\Theta_n$ is used as a word dictionary to be recognized, thereby to detect an appearance position of each keyword included in the audio information.

At step SD8, the synchronization information analyzer 713 distributes K pieces of continuous speech segment information $v_1$ to $v_k$ to N document blocks $b_1$ to $b_n$ by $x_n$ pieces from the header, according to the dynamic programming method, as shown in FIG. 20.

Specifically, the number of pieces of continuous speech segment information distributed to the document blocks $b_1$ to $b_n$ is set to $k_n$. When a profit (probability of distribution) obtained by distributing $x_n$ pieces of continuous speech segments in the $k_{n-1}$-th block and after to the document block $b_n$ is $g_n$ ($k_{n-1}$, $x_n$), this $g_n$ ($k_{n-1}$, $x_n$) is defined by the following equations (15) to (17).

$$g_n(k_{n-1}, x_n) = \sum_{i=1}^{x_n} N_n(e_{k_{n-1}+i,n}) \quad (15)$$

$$N_n(e_{k,n}) = \frac{e_{k,n}}{\sum_{i=1}^{K} e_{i,n}} \quad (16)$$

$$e_{k,n} = \sum_{\theta \in \Theta_n} \lfloor w_{n,\theta} \times \beta_{k,n,\theta} \rfloor \quad (17)$$

In the equation (17), $W_n$, $\theta$ is a keyword weighting coefficient indicating a probability that the keyword $\theta$ ($\theta \in \Theta_n$) belongs to the document block $b_n$, as described above. A frequency $\beta_{k,n}$, $\theta$ indicates a speech frequency indicating a number of times when the keyword $\theta$ is actually spoken in the continuous speech segment corresponding to the continuous speech segment information $v_k$, as described above.

When the continuous speech segment information $v_k$ corresponds to the document block $b_n$, a value obtained through (the probability that the keyword $\theta$ spoken in the continuous speech segment information $v_k$ corresponds to the document block $b_n$)×(speech frequency) is estimated to be a larger value as compared to that when the continuous speech segment information $v_k$ does not correspond to the document block $b_n$.

The equation (17) shows a calculation of the above values for all the keywords, and $e_{k,n}$ shows a probability that the continuous speech segment information $v_k$ is allocated to the document block $b_n$.

When a large number of keywords appear in the document block, $e_{k,n}$ may take an extremely large value in some cases. For example, in the presentation, when a slide is provided to explain the outline at the beginning, many keywords included in other slides appear in this slide.

In this case, a correct correspondence cannot be obtained. Therefore, $e_{k,n}$ itself is not used, but a normalized value in which a total sum of $e_{k,n}$ relating to the document block $b_n$ becomes 1 is used, as a value to be used for $g_n(k_{n-1}, x_n)$. The equation (16) is a normalization equation. In the equation (16), $N_n(e_{k,n})$ shows a normalized value of $e_{k,n}$.

The equation (15) shows a profit (probability of distribution) obtained by distributing $x_n$ continuous speech segments in the $k_{n-1}$-th block and after to the document block $b_n$, as a total sum of $N_n(e_{k,n})$.

In the second embodiment, the above distribution subject is expressed as the following constant subject of obtaining a combination of $(x_1, x_2, \ldots, x_N)$ that satisfies the equation (18). The combination of $(x_1, x_2, \ldots, x_N)$ that satisfies the equation (18) is obtained by the dynamic programming. An analysis according to the dynamic programming will be explained below.

$$f_N(K) = \max\left[\sum_{n=1}^{N} g_n(k_{n-1}, x_n)\right] \quad (18)$$

The synchronization information analyzer 713 develops the equation (18) into the following two functional recursive equations (the equation (19) and the equation (20)).

$$f_1(k_1) = \max_{0 \leq x_1 = k_1 \leq k_N} [g_1(0, x_1)] = g_1(0, k_1) \quad (19)$$

$$f_n(k_n) = \max_{0 \leq x_n \leq k_N} [g_n(k_n - x_n, x_n) + f_{n-1}(k_n - x_n)] \quad (20)$$

The synchronization information analyzer 713 obtains an optimum combination of $(x_1, x_2, \ldots, x_N)$ by using the equation (19) and the equation (20). In other words, first, the synchronization information analyzer 713 calculates $f_1(k_1)$ for each case of $k_1$ from 0 to K when n=1 by using the equation (19), and stores a value in a second column of the following table 1. In this case, as a condition of $x_1=k_1$ is established, the value of the first column becomes equal to the value of the third column.

TABLE 1

| $k_1$ | $f_1(k_1)$ | $x_1$ |
|---|---|---|
| 0 | NUMERICAL VALUE | 0 |
| 1 | NUMERICAL VALUE | 1 |

TABLE 1-continued

| $k_1$ | $f_1(k_1)$ | $x_1$ |
|---|---|---|
| 2 | NUMERICAL VALUE | 2 |
| . | . | . |
| . | . | . |
| . | . | . |
| K | NUMERICAL VALUE | K |

The synchronization information analyzer 713 then calculates $f_2(k_2)$ from the value of $f_1(k_1)$ by using the equation (20). In other words, when n=2, from the equation (20), $f_2(k_2)$ is given by the following equation (21).

$$f_2(k_2) = \max_{x_2=0,1,2,\ldots,k_2} [g_2(k_2 - x_2, x_2) + f_1(k_2 - x_2)] \quad (21)$$

The synchronization information analyzer 713 changes $x_2$ from 0 to $k_2$, for each case of $k_2$ from 0 to K, and calculates values of $g_2(k_2-x_2, x_2)+f_1(k_2-x_2)$, and stores a largest value into the second column of the following table 2 as the value of $f_2(k_2)$. A value of $x_2$ when $f_2(k_2)$ becomes a maximum is stored into the third column of the table 2.

TABLE 2

| $k_2$ | $f_2(k_2)$ | $x_2$ |
|---|---|---|
| 0 | NUMERICAL VALUE | NUMERICAL VALUE |
| 1 | NUMERICAL VALUE | NUMERICAL VALUE |
| 2 | NUMERICAL VALUE | NUMERICAL VALUE |
| . | . | . |
| . | . | . |
| . | . | . |
| K | NUMERICAL VALUE | NUMERICAL VALUE |

Similarly, the synchronization information analyzer 713 calculates $f_n(k_n)$ from the value of $f_{l-1}(k_{l-1})$ by using the equation (20), and stores a value in the following table 3.

TABLE 3

| | $f_n(k_n), n = 1, 2, \ldots, N$ | | | | | | | |
|---|---|---|---|---|---|---|---|---|
| | n = 1 | | n = 2 | | n = N − 1 | | n = N | |
| $k_n$ | $f_1(k_1)$ | $x_1$ | $f_2(k_2)$ | $x_2$ | $f_{N-1}(k_{N-1})$ | $x_{N-1}$ | $f_N(k_N)$ | $x_N$ |
| 0 | NUMERICAL VALUE | 0 | NUMERICAL VALUE | NUMERICAL VALUE | ... NUMERICAL VALUE | NUMERICAL VALUE | NUMERICAL VALUE | NUMERICAL VALUE |
| 1 | NUMERICAL VALUE | 1 | NUMERICAL VALUE | NUMERICAL VALUE | ... NUMERICAL VALUE | NUMERICAL VALUE | NUMERICAL VALUE | NUMERICAL VALUE |
| 2 | NUMERICAL VALUE | 2 | NUMERICAL VALUE | NUMERICAL VALUE | ... NUMERICAL VALUE | NUMERICAL VALUE | NUMERICAL VALUE | NUMERICAL VALUE |
| . | . | . | . | . | . | . | | |
| . | . | . | . | . | . | . | | |
| . | . | . | . | . | . | . | | |
| K | NUMERICAL VALUE | K | NUMERICAL VALUE | NUMERICAL VALUE | ... NUMERICAL VALUE | NUMERICAL VALUE |  NUMERICAL VALUE |  NUMERICAL VALUE |

The value of $f_N(K)$ in the equation (18) becomes $f_N(k_N)$ in a shaded portion at a right lower side of the table 3 when $k_N=K$. As $x_N$ that is necessary for obtaining $f_N(K)$ is also stored in the table 3, the synchronization information analyzer 713 fixes this numerical value ($x_N$ in the shaded portion) as the value of $x_N$.

As there is a relationship of $k_N=k_{N-1}+x_N$, the synchronization information analyzer 713 searches for $f_{N-1}(k_{N-1})$ of $k_{N-1}$ when $k_{N-1}=k_N-x_N$, and fixes the value of $x_{N-1}$. Similarly, as the value of $x_{N-1}$ is specified from the table 3 and a fixed value of $x_n$, the value of $x_n$ is fixed until n=1. This fixed value ($x_1, x_2, \ldots, x_N$) is considered to satisfy $f_N(K)$ in the equation (18).

Figure 21:
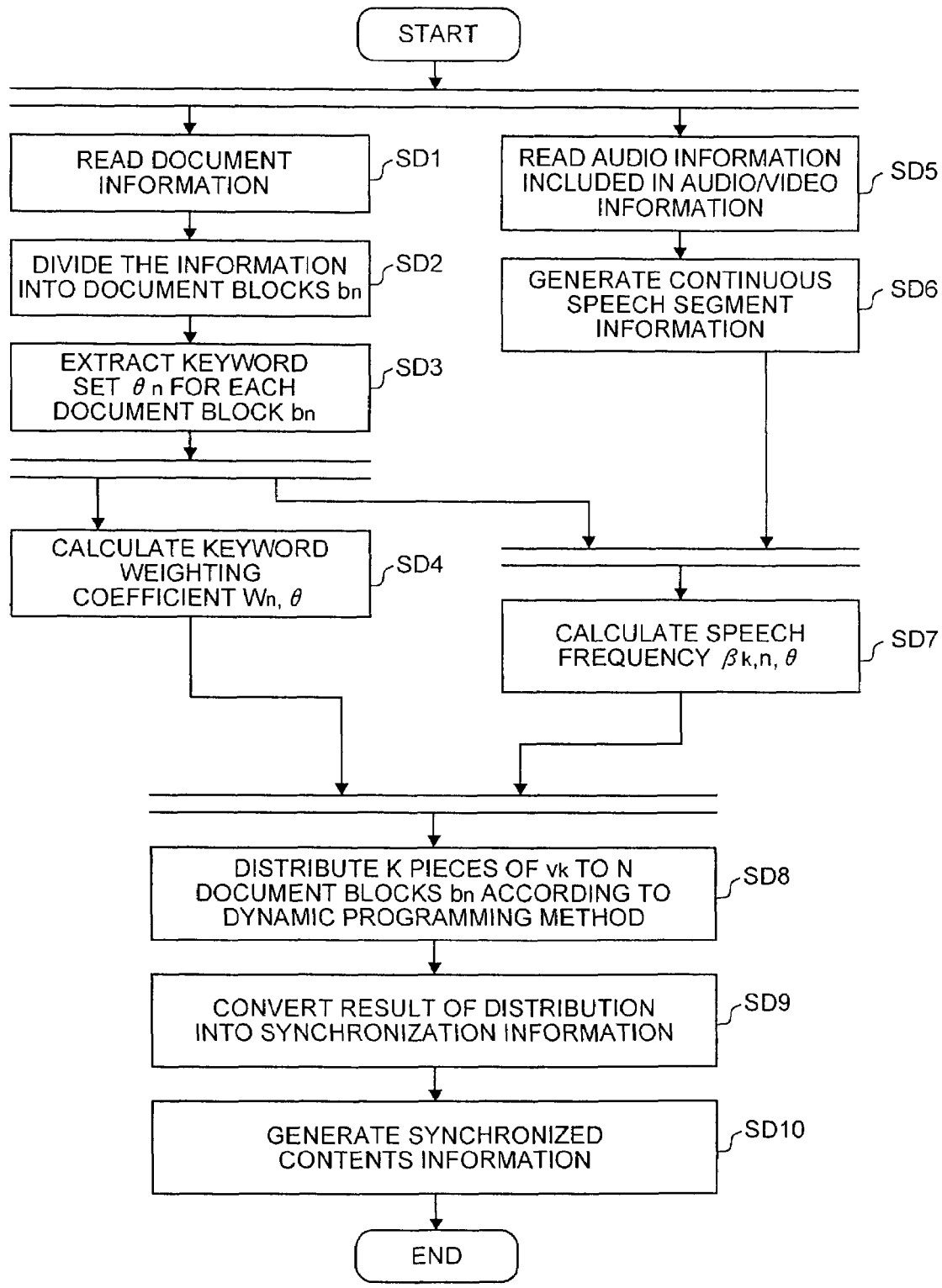
FIG. 21 is a flowchart for explaining the operation of the second embodiment.

At step SD9 shown in FIG. 21, the synchronization information analyzer 713 obtains a display starting time $s_n$ of the document block $b_n$ from the following equations (22) and (23), based on the distribution ($x_1, x_2, \ldots, x_N$) of the continuous speech segment corresponding to the continuous speech segment information $v_k$.

$$S_n = \min_{k_{n-1} < k \leq k_n} [\text{STARTING TIME OF } V_k] \quad (22)$$

$$k_n = \sum_{i=1}^{n} x_i \quad (23)$$

The equation (23) shows a number $k_n$ of continuous speech segment information included in the header document block $b_1$ to the document block $b_n$ shown in FIG. 20. The equation (22) means that starting time information of a smallest (oldest) value among the starting time information (refer to FIG. 16) included in the continuous speech segment information corresponding to the document block $b_n$, is defined as a display starting time $s_n$ of this document block $b_n$.

The synchronization information analyzer 713 decides a display starting time sequence S ($s_1, s_2, \ldots, s_N$) that is the sequence of the display starting time $s_1$ to $s_N$ in the document blocks ($b_1$ to $b_N$), as synchronization information.

At step SD10, the synchronized contents information generator 714 generates, for example, the synchronized contents information 731 shown in FIG. 18 based on the display starting time sequence S ($s_1, s_2, \ldots, s_N$) from the synchronization information analyzer 713, document information, and audio/video information to store the generated information into the synchronized contents information database 730.

In this synchronized contents information 731, "data in first page of electronic document begin=$s_1$" shown in FIG. 19 corresponds to the display starting time s1 included in the display starting time sequence S. Therefore, the display of the document information in the first page (document block $b_1$) is started at the display starting time $s_1$ on the time axis of the audio/video information, and the display is ended at end =$s_2$.

When there is a reproduction request from the reproducing unit 400, the controller 502 reads the synchronized contents information 731 (refer to FIG. 18 and FIG. 19) from the synchronized contents information database 730, and transmits this information to the reproducing unit 400.

Thus, the reproducing unit 400 reproduces the audio/video information and the document information based on the reproduction screen format 600 corresponding to the synchronized contents information 731. Pages of the document are sequentially displayed in parallel with a video stream at timings based on the display starting time sequence S.

As explained above, according to the second embodiment, as shown in FIG. 20, the document information whose document is an electronic document is divided into a plurality of document blocks (b1 to bN). The audio information is segmented into a plurality of continuous speech segments (continuous speech segment information $v_1$ to $v_k$), based on the audio/video information that is recorded audio and video of how a speaker speaks using the document. Thereafter, the plurality of continuous speech segments are distributed to the plurality of document blocks according to the dynamic programming method. Based on a result of the distribution, the synchronized contents information is generated to be used to display the document information in synchronization with the audio/video information. Therefore, it is possible to generate the synchronized contents information without requiring any particular equipment like a projector.

According to the present invention, the keyword weighting coefficient $W_n$, θ indicating the probability that a keyword extracted from each document block belongs to a particular document block, is obtained. A speech frequency $\beta_{k,n}$, θ of the keyword is obtained for each continuous speech segment. Thereafter, a distribution is carried out based on an evaluation function E ($x_1, x_2, \ldots, x_N$) determined from the keyword weighting coefficient $W_n$, θ and the speech frequency $\beta_{k,n}$, θ. Therefore, it is possible to generate the synchronized contents information without requiring any particular equipment like a projector.

While the first embodiment and the second embodiment of the present invention have been explained in detail with reference to the drawings, detailed structure examples are not limited to those explained in the first and second embodiments. It should be noted that any modification in the design within a range not deviating from the gist of the present invention is included in the present invention.

Figure 22:
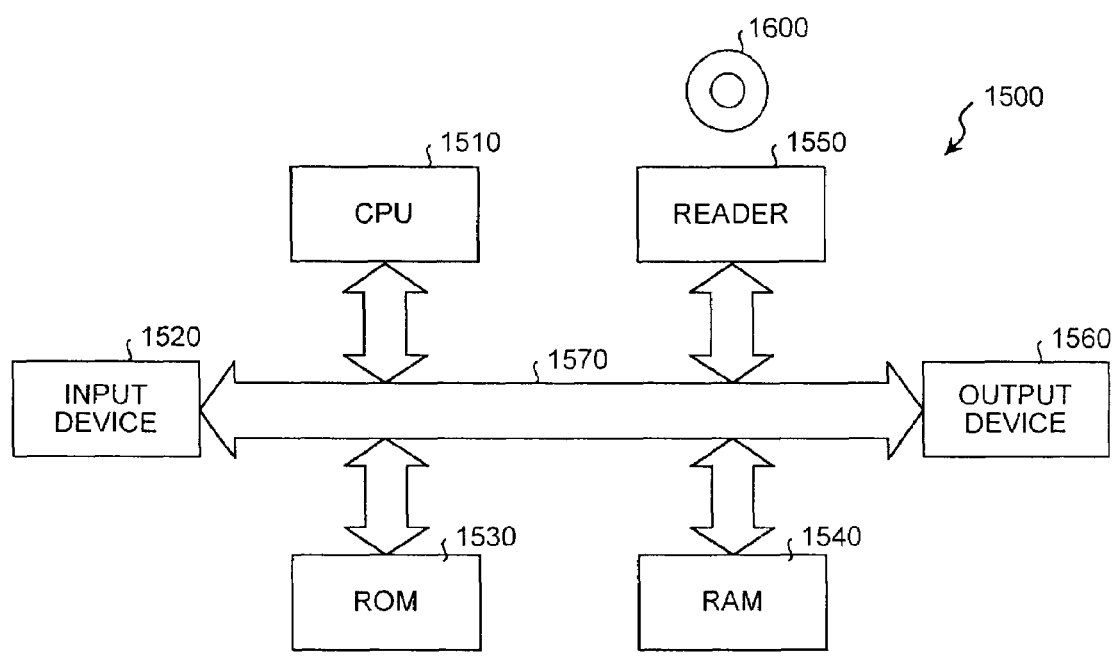
FIG. 22 is a block diagram showing a structure of a second modification of the first embodiment and a modification of the second embodiment.

For example, in the first and second embodiments, a program to realize the functions of the synchronized contents information generating apparatus 500 or 700 may be recorded on a computer-readable recording medium 1600 shown in FIG. 22. The program recorded on this recording medium 1600 is loaded into a computer 1500 shown in this figure, and the functions may be realized by executing the program on the computer 1500. This example will be explained below as a second modification of the first embodiment and a modification of the second embodiment.

The computer 1500 shown in FIG. 22 is constructed of a CPU (Central Processing Unit) 1510 that executes the above program, an input device 1520 like a keyboard and a mouse, a ROM (Read Only Memory) 1530 on which various data are recorded, a RAM (Random Access Memory) 1540 on which arithmetic parameters and the like are stored, a reader 1550 that reads the program from the recording medium 1600, an output device 1560 like a display and a printer, and a bus 1570 that connects between various sections of the devices.

The CPU 1510 reads the program recorded on the recording medium 1600 via the reader 1550 and executes this program, thereby to realize the above functions. The recording medium 1600 may be an optical disk, a flexible disk, and a hard disk or the like.

While the application of the invention to a meeting has been explained as one example in the first and second embodiments, the application field of the invention is not limited to this. The invention is applicable to other fields as well. For example, in the education field, lecture contents of lecturers are stored as audio/video information. Synchronized contents information having a relevant material in synchronization with the audio/video information may be automatically generated. At a later date, the contents information can be used as a review teaching material on computer apparatuses for students connected online. With this arrangement, a high educational effect is expected.

As explained above, according to one aspect of the present invention, the keyword appearance distribution in the order in which the extracted each keyword appears is measured, based on the audio/video information that is recorded audio and video of how a speaker speaks using the document. The synchronized contents information is then generated to be used to display the document information in synchronization with the audio/video information. Therefore, it is advantageously possible to generate the synchronized contents information without requiring any particular equipment like a projector.

According to another aspect of the present invention, the document information whose document is an electronic document is divided into document blocks. The audio information is segmented into continuous speech segments, based on the audio/video information that is recorded audio and video of how a speaker speaks using the document. Thereafter, the continuous speech segments are distributed to the plurality of document blocks. Based on a result of the distribution, the synchronized contents information is generated to be used to display the document information in synchronization with the audio/video information. Therefore, it is advantageously possible to generate the synchronized contents information without requiring any particular equipment like a projector.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer readable storage medium having stored thereon a synchronized contents information generating program that makes a computer function as:

a keyword extracting unit that extracts a characteristic keyword or characteristic keywords from document information whose document is an electronic document;

a keyword appearance distribution measuring unit that measures a distribution of appearances of the keyword in the order in which the extracted each keyword appears, based on audio/video information that is recorded audio and video of how a speaker speaks using the document; and a synchronized contents information generating unit that generates synchronized contents information used to display the document information in synchronization with the audio/video information based on the keyword appearance distribution, wherein, the synchronized contents information generating unit synchronizes the audio/video information with the document information, based on either one of an evaluation function that takes a maximum value when an appearance distribution of the keyword corresponding to the document information coincides with the keyword appearance distribution and keyword type information included in the document information.

2. A synchronized contents information generating apparatus comprising:

a keyword extracting unit that extracts a characteristic keyword or characteristic keywords from document information whose document is an electronic document;

a keyword appearance distribution measuring unit that measures a distribution of appearances of the keyword in the order in which the extracted each keyword appears, based on audio/video information that is recorded audio and video of how a speaker speaks using the document; and a synchronized contents information generating unit that generates synchronized contents information used to display the document information in synchronization with the audio/video information based on the keyword appearance distribution, wherein, the synchronized contents information generating unit synchronizes the audio/video information with the document information, based on either one of an evaluation function that takes a maximum value when an appearance distribution of the keyword corresponding to the document information coincides with the keyword appearance distribution and keyword type information included in the document information.

3. A synchronized contents information generating method comprising the steps of:

extracting a characteristic keyword or characteristic keywords from document information whose document is an electronic document;

measuring a keyword appearance distribution that is a distribution of appearances of the keyword in the order in which the extracted each keyword appears, based on audio/video information that is recorded audio and video of how a speaker speaks using the document; and generating synchronized contents information used to display the document information in synchronization with the audio/video information based on the keyword appearance distribution, wherein
the synchronized contents information generating step includes synchronizing the audio/video information with the document information, based on either one of an evaluation function that takes a maximum value when an appearance distribution of the keyword corresponding to the document information coincides with the keyword appearance distribution and keyword type information included in the document information.

4. A computer readable storage medium having stored thereon a synchronized contents information generating program that makes a computer function as:
a document block dividing unit that divides document information whose document is an electronic document, into a plurality of document blocks;
an audio segmenting unit that segments audio information into a plurality of continuous speech segments, based on audio/video information that is recorded audio and video of how a speaker speaks using the document;
a distributing unit that distributes the continuous speech segments to the document blocks; and
a synchronized contents information generating unit that generates synchronized contents information used to display the document information in synchronization with the audio/video information based on a result of the distribution,
wherein the document block dividing unit extracts a keyword from each document block, and obtains a keyword weighting coefficient indicating a probability that the keyword belongs to a document block,
the audio segmenting unit obtains a speech frequency of the keyword for each of the continuous speech segments, and
the distributing unit carries out the distribution based on an evaluation function determined from the keyword weighting coefficient and the speech frequency.

5. The computer readable storage medium according to claim 4, wherein the document block dividing unit extracts a keyword from each document block, and obtains a keyword weighting coefficient indicating a probability that the keyword belongs to a document block,
the audio segmenting unit obtains a speech frequency of the keyword for each of the continuous speech segments, and
the distributing unit carries out the distribution based on an evaluation function determined from the keyword weighting coefficient and the speech frequency.

6. The computer readable storage medium according to claim 4, wherein the document block dividing unit obtains a frequency with which the keyword appears in the document block, and obtains the keyword weighting coefficient based on this frequency and frequencies of appearances of the keyword in document blocks before and after the document block.

7. The computer readable storage medium according to claim 4, wherein the distributing unit carries out the distribution using a dynamic programming method.

8. A synchronized contents information generating apparatus comprising:
a document block dividing unit that divides document information whose document is an electronic document, into document blocks;
an audio segmenting unit that segments audio information into continuous speech segments, based on audio/video information that is recorded audio and video of how a speaker speaks using the document;
a distributing unit that distributes the continuous speech segments to the document blocks; and
a synchronized contents information generating unit that generates synchronized contents information used to display the document information in synchronization with the audio/video information based on a result of the distribution,
wherein the document block dividing unit extracts a keyword from each document block, and obtains a keyword weighting coefficient indicating a probability that the keyword belongs to a document block,
the audio segmenting unit obtains a speech frequency of the keyword for each of the continuous speech segments, and
the distributing unit carries out the distribution based on an evaluation function determined from the keyword weighting coefficient and the speech frequency.

9. The synchronized contents information generating apparatus according to claim 8, wherein the document block dividing unit obtains a frequency with which the keyword appears in the document block, and obtains the keyword weighting coefficient based on this frequency and frequencies of appearances of the keyword in document blocks before and after the document block.

10. The synchronized contents information generating apparatus according to claim 8, wherein the distributing unit carries out the distribution using a dynamic programming method.

11. A synchronized contents information generating method comprising the steps of:
dividing document information whose document is an electronic document, into document blocks;
segmenting audio information into continuous speech segments, based on audio/video information that is recorded audio and video of how a speaker speaks using the document;
distributing the continuous speech segments to the document blocks; and
generating synchronized contents information used to display the document information in synchronization with the audio/video information based on a result of the distribution,
wherein the document block dividing step includes extracting a keyword from each document block, and obtaining a keyword weighting coefficient indicating a probability that the keyword belongs to a document block,
the audio segmenting step includes obtaining a speech frequency of the keyword for each of the continuous speech segments, and
the distributing step includes carrying out the distribution based on an evaluation function determined from the keyword weighting coefficient and the speech frequency.

12. The synchronized contents information generating method according to claim 11, wherein the document block dividing step includes obtaining a frequency with which the keyword appears in the document block, and obtaining the keyword weighting coefficient based on this frequency and frequencies of appearances of the keyword in document blocks before and after the document block.

13. The synchronized contents information generating method according to claim 11, wherein the distributing step includes carrying out the distribution using a dynamic programming method.

* * * * *

UNITED STATES PATENT AND TRADEMARK OFFICE
CERTIFICATE OF CORRECTION

PATENT NO.         : 7,516,415 B2                                              Page 1 of 1
APPLICATION NO. : 10/331504
DATED              : April 7, 2009
INVENTOR(S)        : Seiya Shimizu et al.

It is certified that error appears in the above-identified patent and that said Letters Patent is hereby corrected as shown below:

Title Page item [73], Column 1 (Assignee), Line 1, change "Kawsakai (JP)" to --Kawasaki (JP)--.

Column 25, Line 1, after "wherein" insert --,--.

Signed and Sealed this

First Day of September, 2009

David J. Kappos
*Director of the United States Patent and Trademark Office*